(12) United States Patent
Grover

(10) Patent No.: US 6,421,349 B1
(45) Date of Patent: Jul. 16, 2002

(54) DISTRIBUTED PRECONFIGURATION OF SPARE CAPACITY IN CLOSED PATHS FOR NETWORK RESTORATION

(75) Inventor: Wayne D. Grover, Edmonton (CA)

(73) Assignee: Telecommunications Research Laboratories, Edmonton (CA)

( * ) Notice: Subject to any disclaimer, the term of this patent is extended or adjusted under 35 U.S.C. 154(b) by 0 days.

(21) Appl. No.: 08/893,491

(22) Filed: Jul. 11, 1997

(51) Int. Cl.[7] ............................................... G01R 31/08
(52) U.S. Cl. ............................. 370/408; 370/227; 714/4
(58) Field of Search .................................. 370/216, 218, 370/221–225, 228, 254, 255, 258, 907, 908, 226, 227; 714/4, 717, 712; 340/825.01, 825.02, 825.03, 827, 825.16

(56) References Cited

U.S. PATENT DOCUMENTS

| | | | | |
|---|---|---|---|---|
| 5,146,452 A | * | 9/1992 | Pekarske | 370/228 |
| 5,173,689 A | * | 12/1992 | Kusano | 714/4 |
| 5,235,599 A | * | 8/1993 | Nishimura et al. | 714/4 |
| 5,435,003 A | * | 7/1995 | Chng et al. | 714/4 |
| 5,495,471 A | * | 2/1996 | Chow et al. | 370/228 |
| 5,537,532 A | * | 7/1996 | Chng et al. | 714/4 |
| 5,590,119 A | * | 12/1996 | Moran et al. | 370/225 |
| 5,835,482 A | * | 11/1998 | Allen | 370/225 |
| 5,850,505 A | * | 12/1998 | Grover | 370/227 |
| 5,999,286 A | * | 12/1999 | Venkatesan | 370/225 |

* cited by examiner

*Primary Examiner*—Wellington Chin
*Assistant Examiner*—Steven Nguyen
(74) *Attorney, Agent, or Firm*—Anthony R. Lambert

(57) ABSTRACT

A Method for restoring traffic in a network. The network includes plural distinct nodes interconnected by plural distinct spans, each span having working links and spare links. Each node has a digital cross-connect switch for making and breaking connections between adjacent spans forming span pairs at a node. Cross-connections between spare links in adjacent spans are made such that sets of successive nodes through which the adjacent spans form span paths form closed paths. A method of finding and construction closed paths is described in which statelets are broadcast through the network. In a preferred method of implementation of the method, the statelet broadcast occurs not in response to a network failure, but across the entire network before any particular span failure and may be carried out during normal network operations as a continual re-configuration of the network.

3 Claims, 12 Drawing Sheets

1) Score = 1.0

2) Score = 2.0

3) Score = 2.2

4) Score = 2.67

5) Score = 2.71

6) Score = 3.00

7) Score = 3.22

8) Score = 3.4

DISTRIBUTED PRECONFIGURATION OF SPARE CAPACITY IN CLOSED PATHS FOR NETWORK RESTORATION

FIELD OF THE INVENTION

This invention relates to methods for restoring networks of spans, for example telecommunications networks, upon the occurrence of a failure of one of the spans or nodes of the network.

BACKGROUND OF THE INVENTION

Methods for the restoration of digital transport networks have been studied for several years. Some researchers have concluded that distributed real-time protocols may operate too slowly to meet operational objectives, such as the 2 second call-dropping threshold in voice networks. This problem can be overcome by preparing the network for anticipated failures by optimally preconfiguring resources which will be used to react to the failure. This places the network into a state of "best readiness" to face a given set of anticipated failures. See W. D. Grover and M. H. MacGregor, "Potential for spare capacity preconnection to reduce crossconnection workloads in mesh-restorable networks", Electronics Letters, Vol. 30, No. 3, pp. 194–195, Feb. 3, 1994. By contrast, M. Herzberg and. S. J. Bye, "An optimal spare-capacity assignment model for survivable networks with hop limits", Proceedings of IEEE Globecom '94, Vol. 3, pp. 1601–1606, IEEE, 1994 deals with the problem of optimum spare capacity amount determination, but does not pre-configure such spares.

The tremendous interest in real-time network restoration over the last few years is evidence both of the importance and difficulty of this problem. Evidence has been mounting that it may not always be possible to meet operational requirements with real-time techniques. The suggested cures have ranged from high speed, parallel computing architectures for digital crossconnect machines to simplified network architectures where restoration can be made to occur more quickly in real-time. The proposal of Grover and MacGregor suggests anticipating failures, and preconfiguring the network to handle them so that real-time computation or reaction delay (one or both) is not required except at the endpoints of the failure. Thus, preconfiguration methods apply where computing a reaction or implementing it (or both) is/are too lengthy a process.

One of the inventors has previously disclosed, in Canadian patent application no. 2,161,847 published May 1, 1997, a method for restoring traffic in a network in which the network is pre-configured for span restoration. The network includes plural distinct nodes interconnected by plural distinct spans, each span having working links and spare links. Each node has a digital cross-connect switch for making and breaking connections between links in adjacent spans forming paths or path segments (span pairs) through nodes. In a broad characterization of the method, there are three steps.

Step 1: For each of at least two possible span failures, (a) find the number of restoration routes available in case of the occurrence of each span failure, (b) determine the resources used by each restoration route, and (c) determine the amount of flow to be restored for each span failure.

Step 2: find, in a computer, the amount of flow $f^p$ to be restored along each restoration route that minimizes total unrestored flow for all possible span failures identified in step 1.

Step 3: form connections at each digital cross-connect switch in the network along each restoration route before occurrence of one of the possible span failures identified in step 1 to permit the amount of flow $f^p$ determined in step 2 to be carried by each respective restoration route upon the occurrence of one of the possible span failures identified in step 1.

PC-restoration design may be generated using trees and unconstrained patterns of genetic algorithm techniques. These approaches have a practical drawback in that there is no constraint on the nodal degrees that a pattern can have (other than the degrees of the underlying nodes.)

The inventor has also proposed, in U.S. Pat. No. 4,956,835, issued Sep. 11, 1990, a method and apparatus of restoring communications between a pair of nodes in a network having an arbitrary number of nodes and an arbitrary number of spans interconnecting the nodes. Each span has working circuits between nodes designated for transmitting actual communications traffic and spare circuits capable of, but not designated for, transmitting actual communications traffic. The method comprises the steps of (a) establishing one or more independent communication paths between the pair of nodes through a series of spare circuits of spans interconnecting the pair of nodes and other interconnected nodes in the network; and (b) redirecting communications traffic intended for one or more failed spans interconnecting the pair of nodes through one or more of the paths. However, self-healing networks operating pursuant to the method described in U.S. Pat. No. 4,956,835 are reactive in that the establishment of a communications path occurs only after the occurrence of a span failure, or in response to a demand for additional capacity. In addition, the self-healing network utilizes distinct end nodes for the initiation of a broadcast of signatures and initiating construction of a restoration path. Further, the self-healing network utilizes the broadcast of signatures that in themselves do not contain the information required to construct the restoration path.

There also has been proposed, in order to enhance survivability of networks, the concept of self-healing rings (Wu, "Fiber Network Service Survivability", Boston, USA, 1992, in particular, Ch. 4). In a self-healing ring, nodes are interconnected by spans organized into rings. Each span includes working links and spare links. Add-drop multiplexers (ADMs) at the nodes react to a span failure on the ring to restore a communications path in one of two ways. If only a working link is lost, communications may be restored along the same span by dropping the working link and adding a spare link on that span. If an entire span is lost, communications may be restored by re-routing traffic in the opposite direction around the ring, using either working or spare links in the ring.

Self-healing rings only protect the spans on the ring itself and provide at most one restoration route per failure. In addition, protection paths of one ring overlapping a span are only available to failed working spans in the same ring. A working path routing must be realized by a succession of ring-arc tranversals and ring to ring transfers. Each ring functions on its own in its as built configuration.

SUMMARY OF THE INVENTION

There is proposed a method that overcomes disadvantages in these aforementioned network restoration schemes. Therefore, in accordance with one aspect of the invention, there is proposed a method of operating a telecommunications network in which the telecommunications network includes plural distinct nodes interconnected by plural distinct spans, each node having a digital cross-connect switch for making and breaking connections between links in adjacent spans forming span paths through the node, the method comprising the steps of:

a) providing a set of successive nodes capable of forming a closed path in the network, with at least one spare link between each pair of adjacent nodes in the closed path;

b) forming a cross-connection at each node in the closed path to connect spare links in each of the adjacent spans lying in the closed path and thus form a span path through each node in the closed path.

By configuration of the controller of the digital cross-connect switch at a node, upon occurrence of a span failure on any span between any two nodes in the closed path, wherein the span failure is not at a span in the closed path, telecommunications traffic may be routed along the closed path.

Preferably, according to an aspect of the invention, providing a set of successive nodes capable of forming a closed path comprises:

(a1) selecting an originating node; and (a2) searching for and identifying a set of intermediate nodes that, together with the originating node, may form a closed path having at least one spare link between each pair of adjacent nodes in the closed path.

In a further aspect of the invention, searching for a set of intermediate nodes that may form a closed path comprises:

broadcasting statelets from successive nodes in the network along successive spans having at least one spare link in each span at least until a first statelet is broadcast to the originating node, in which the successive nodes are not capable of forming a closed path that does not include the originating node and each statelet is prevented from being broadcast along the span on which the statelet arrived at the intermediate node.

In a still further aspect of the invention, broadcasting statelets comprises:

initiating a broadcast from an originating node by broadcasting an originating statelet; and receiving incoming statelets at intermediate nodes, and broadcasting at least one statelet received by each intermediate node to one or more nodes adjacent to the intermediate node and connected to the intermediate node by at least one spare link.

In a further aspect of the invention, only one statelet derived from the same originating statelet is broadcast, at any intermediate node, on any one span.

In a further aspect of the invention, each statelet is broadcast to the maximum extent possible at each successive node.

In a further aspect of the invention, a statelet broadcast through the network is modified at each intermediate node to update a route field in the statelet that records the successive nodes by which the statelet has been broadcast.

In a further aspect of the invention, incoming statelets at an intermediate node are broadcast preferentially according to an ordering of the incoming statelets.

In a further aspect of the invention, a statelet broadcast through the network is modified at each intermediate node to update a numPaths field in the statelet that records the number of paths available for restoration of telecommunications traffic along the successive nodes by which the statelet has been broadcast.

In a further aspect of the invention, a statelet broadcast through the network is modified at each intermediate node to update a hop count field in the statelet that records the number of spans traversed by the statelet.

In a further aspect of the invention, incoming statelets at an intermediate node are broadcast preferentially according to an ordering of the incoming statelets based upon relative values of the numPaths and hop count fields of the incoming statelets.

In a further aspect of the invention, a closed path is formed by making cross-connections between successive spans in one of several routes followed by incoming statelets received by an originating node, which one of several routes may be selected according to an ordering of fields in the incoming statelets. The ordering may be based upon a relationship between the number of paths available for restoration of telecommunications traffic along the successive nodes by which each incoming statelet has been broadcast and the number of spans traversed by the respective incoming statelets.

In a further aspect of the invention, routes followed by incoming statelets are evaluated for a pre-determined period.

In a further aspect of the invention, steps a1 and a2 are repeated for each of several originating nodes in the network.

In a further aspect of the invention, steps a2 and b are periodically repeated at a node. The network will have a configuration of working links, and repetition of steps a2 and b at a node may be carried out after a change of the configuration of working links in the network. The repetition of steps a2 and b at a node may be carried out for each of several nodes in the network.

In a further aspect of the invention, there is provided a method of establishing a connected telecommunications route through a telecommunications network, in which the telecommunications network includes plural distinct nodes interconnected by plural distinct spans, each node having a digital cross-connect switch for making and breaking connections between links in adjacent spans forming span paths through the node, the method comprising the steps of:

broadcasting a statelet from an originating node along successive spare links to successive intermediate nodes in the network commencing with at least one node adjacent to the originating node and connected to the originating node with a spare link, wherein the statelet has a route field containing information on the route of successive intermediate nodes by which the statelet has been broadcast;

updating the route field at each successive intermediate node;

receiving the statelet at an end node; and constructing a connected path of cross-connected spare links along the route defined by the route field of the statelet received at the end node.

In a further aspect of the invention, several statelets are received at the end node, each statelet having a distinct route associated with the statelet, and the connected path is formed along only a selected one of the distinct routes.

In a further aspect of the invention, the selected one of the distinct routes is selected according to an ordering of the distinct routes.

In a further aspect of the invention, the end node is the originating node.

In a further aspect of the invention, the end node is not the originating node.

In a further aspect of the invention, a unique index character is assigned to each statelet broadcast along a spare link from the originating node; and only one statelet having a specific index character is broadcast along any one span.

In a further aspect of the invention, statelets received by an intermediate node are preferentially broadcast according to an ordering of the statelets.

The closed path preconfiguration method greatly simplifies the restoration protocol as only the end nodes of a failed span need to act to substitute traffic; no signalling is required to or amongst other network nodes. Restoration becomes even simpler than in the bidirectional line switches ring (BLSR) signalling protocol. Closed path pre-configuration is also different from the idea of self-healing rings (SHRs). The preconfigured closed paths here may contribute flexibly to the restoration of many network spans both on and off of the closed path. This is fundamentally different than SHR technology: SHRs only protect the spans on the ring itself and provide at most one restoration route per failure. However, PC closed paths within. the spare capacity of a mesh network contribute up to 2 restoration paths per failure and can contribute to restoration of any network span failure not just those along the closed path. It is in that sense that this remains a mesh type restoration technology. The capacity requirements also reflect the very significant difference between PC-closed path technology and SHR technology since here we see closed path PC designs in the same capacity regime as span restorable mesh design whereas corresponding SHR based networks are typically 3 to 6 times greater in total capacity (W. D. Grover, Chapter 11 of Telecommunications Network Management Into the 21st Century, IEEE Press, 1994, pp. 337–413, edited by S. Aidarous and T. Plevyak). In sum, closed path-oriented preconfigured spare capacity design (DCPC) seems to open the door to a restoration technology that enables the restoration speed of rings while retaining the capacity efficiency of a span restorable mesh network.

These and other aspects of the invention are described in the detailed description of the invention and claimed in the claims that follow.

BRIEF DESCRIPTION OF THE DRAWINGS

There will now be described preferred embodiments of the invention, with reference to the drawings, by way of illustration, in which like numerals denote like elements and in which.

DETAILED DESCRIPTION OF PREFERRED EMBODIMENTS

Definitions

Figure 1A:
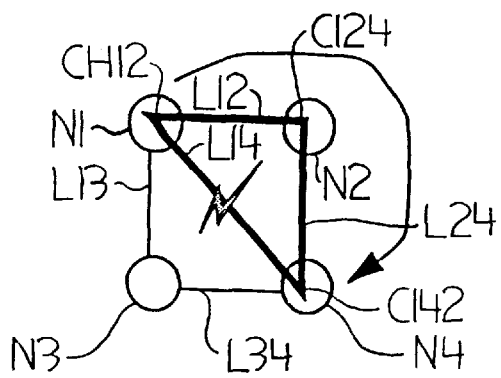
FIG. 1A is a schematic of a network showing an exemplary pre-configured path that a single preconfigured closed path can provide towards the restoration of a failed span.

The term link denotes an individual bidirectional digital signal carrier between adjacent nodes at the DCS signal management level, for instance one DS-3, STS-1 or STS-N. A link between two nodes may be one of many links between the two nodes. A span is the set of all working and spare links in parallel between adjacent nodes. A preconfigured crossconnection is a crossconnection at a node which is preset between spare links in statistical anticipation of a span failure. A PC plan is the network wide state of all preconfigured crossconnections and the spare links which they interconnect. An individual PC pattern (or just "pattern") is a connected subgraph of unit link capacity formed from spare links and preconfigured crossconnections. An individual pattern has at most one link on any span. A useful path, or useful PC path, is a path contained in a PC pattern which is able to contribute to the restoration of a given failure. Any PC paths in a PC plan in excess of the number of working links to be restored in given failure are not useful paths. An uncovered working link is a working link which does not have a PC restoration path immediately available to it in the PC plan should it fail. This does not mean it is unrestorable. It may still be restorable using on-demand crossconnect operations, to supplement the useful paths in the PC plan for the given failure. Related to this are the concept of ksp restorability and 2-step restorability. The k-shortest paths (KSP) restorability of a network is the restorability when using a KSP algorithm to calculate a restoration pathset for each of the networks failed spans with the given numbers of spare links but without regard to any PC plan. The preconfigured (PC) restorability of a network is the restorability when relying only on restoration path segments that are found already formed with a network's PC plan. The PC restorability indicates how effective the network's PC plan is at providing immediately useful paths for restoration without any new crossconnection workload. The "2-step" restorability of a network is the total network restorability when all useful PC paths are first applied to the span failure and, if needed, additional on-demand (2nd step) KSP paths are found within the unallocated spare capacity of the PC plan plus any pruned spare capacity from the PC restoration step. An unallocated spare link is a spare link which does not belong to any individual PC pattern of the PC plan. A pruned spare link is a spare link which was a part of a PC pattern but was not needed to form a PC path for a given span failure and is "pruned" to isolate it from the useful portion(s) of a PC pattern.

Network Design

Each node N in the networks shown in the figures incorporates a conventional digital cross-connect switch (DCS) for making and breaking connections, between links LXY and LZX in adjacent spans meeting at the node. The links may connect to the nodes through fiber optic terminals, for example AT&T FT Series G, for electrical/optic conversion of the signals. Exemplary digital cross-connect switches are the AT&T DACS IV-2000, Alcatel RDX-33 and the Tellabs Titan Model 5533. Adjacent spans, for example spans including links LYX and LXZ at a node NX form a span pair. A network operations center (not shown), for example an AT&T Transport and Maintenance System, controls the operation of the digital cross-connect switches at the nodes via a control overlay of for example X.25 communications links (not shown). The network operations center includes a computer that may instruct the digital cross-connect switches to make and break connections between links in adjacent spans. The computer may be, for example, a UNIX work station that may be connected directly to the digital cross-connect switches via the X.25 communications links and through an X.25 packet assembler-disassembler.

According to the present invention, a network is pre-configured with nodes connected in closed paths without intervention of the network operations center. The method of pre-configuration operates independently at each node to achieve an overall network configuration of spare links. A closed path is a set of successive nodes in a network interconnected by successive spans, in which each successive span includes at least one spare link and spare links in adjacent spans meeting at a node are connected by the DCS at the node to form a span path through the node. At each node in a closed path there is one and only one span path through the node that is connected within the closed path. In other words, all nodes in a closed path are of degree two. A node may have more than one closed path passing through the node, but the closed paths are not connected to allow communications traffic between them.

Figure 1B:
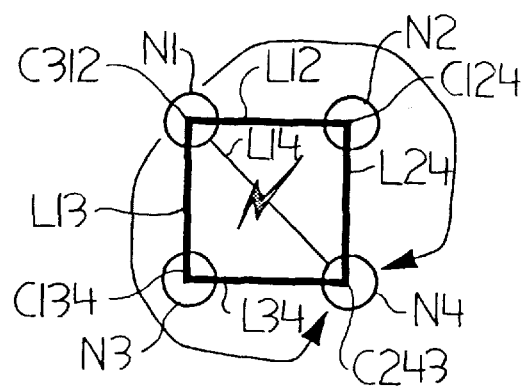
FIG. 1B is a schematic of the network of 1A, with different cross-connections, showing two preconfigured paths that a single preconfigured closed path can provide towards the restoration of a failed span.
Figure 2A:
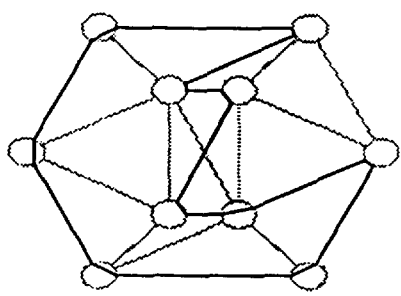
FIGS. 2A–2D show examples of patterns generated in a test network using a linear programming based preconfiguration closed path.
Figure 2B:
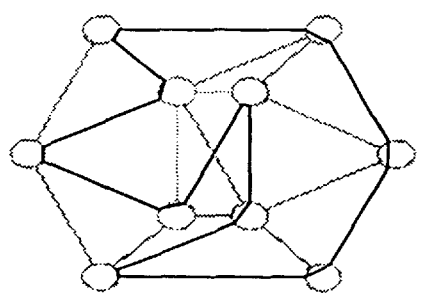
Figure 2C:
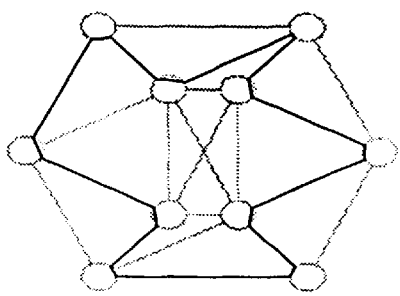
Figure 2D:
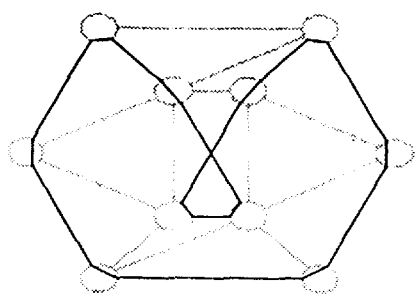

Exemplary closed paths are shown in FIGS. 1A and 1B, in which are shown two networks formed of plural distinct nodes N1, N2, N3 and N4 interconnected by plural distinct links L12, L23, L13, L34 and L14, wherein LXY indicates a spare link between node NX and node NY. In FIG. 1A, cross-connections C412, C124 and C142 are made to connect nodes N1, N2 and N4 through spare links L12, L14 and L24 in a closed path. In FIG. 1B, cross-connections C312, C124, C243 and C134 are made to connect nodes N1, N2, N3 and N4 through links L12, L24, L34 and L13.

Various methods may be used to generate connected closed paths pre-configured for use in restoration of networks. Integer Linear Programming (IP) may be used to generate preconfiguration plans using only closed paths as the building block element.

IP-1: PC Design within a Given Spare Capacity Plan

The method that follows is a modified version of an approach used to generate preconfigured restoration plans using linear segments in M. H. MacGregor, W. D. Grover, K. Ryhorchuk, "Optimal spare capacity preconfiguration for faster restoration of mesh networks", accepted for publication by Journal of Network and Systems Management. The embodiment disclosed here permits a set of pre-defined arbitrary example patterns to be defined as building blocks on which it can draw to generate a maximally preconfigured PC design. The result is optimal only with regard to the building block patterns in the input set. After introducing the general formulation we use it specifically to generate pure closed path-oriented PC designs.

For a set P consisting of $N_p$ elemental types of building-block patterns, in which each of the basic patterns has a topologically distinct configuration on the network graph, and where the network spare capacity is already given, the following formulation optimizes the PC design within the given set of existing spares. The objective function is:

$$\text{minimize} \sum_{j=1}^{S} u_j \text{ subject to,} \quad \text{EQ1}$$

$$s_j \geq \sum_{i=1}^{N_p} (spc_{i,j}) n_i \quad \text{EQ2}$$

$$u_j + \sum_{i=1}^{N_p} (pc_{i,j}) n_i = w_j + r_j \quad \text{EQ3}$$

$$0 \leq u_j \leq w_j \quad \text{EQ4}$$

$$r_j \geq 0 \quad \text{EQ5}$$

$$\forall j = 1, 2, \ldots, S \text{ and}$$

$$n_i \geq 0 \quad \text{EQ6}$$

$$\forall i = 1, 2, \ldots, N_p$$

Where: $u_j$ is the number of working links on span j which do not have a PC path available to them (i.e., 'unprotected' working links), S is the number of network spans, $s_j$ is the total number of spare links on span j, $n_i$ is the number of copies of pattern i in the PC design, $spc_{i,j}$ is the number of spare links required on span j for one copy of pattern i, $pc_{i,j}$ is the number of preconfigured paths that a single copy of pattern i from pattern set P can provide for failed span j. $w_j$ is the number of working links which are on span j, and $r_j$ is the number of PC paths provided in the design which are in excess of the working links on span j.

Eq. 2 constrains the total number of spare links in PC patterns to the number of spare links which are present on each span. Eq. 3 gives the relationship between the number of working links on each span ($w_j$), the number of PC paths provided by the PC plan for protection of working links on that span, the number of unprotected working links on each span ($u_j$), and the number of PC paths which may be provided in excess of the protection required for span $j(r_j)$. Note that either one of $u_j$ or $r_j$ is implicitly zero (a network span cannot both be overprotected and underprotected with PC paths.) The design that is returned from this tableau is represented in the $n_i$ variables from which the complete network PC plan can be built.

B. IP-2: PC Design with Spare Capacity Placement

An IP may be formulated for preconfigured spare capacity design in which the spare capacity quantities are free to be determined in conjunction with the preconfigured pattern design so as to reach a min-capacity result that is assured to be 100% PC-restorable. As in the previous section, a design is formed from a pre-defined set of example patterns on the network graph.

The formulation is as follows:

$$\text{minimize} \sum_{j=1}^{s} c_j s_j \text{ subject to:} \quad \text{EQ7}$$

$$s_j \geq \sum_{i=1}^{N_p} (spc_{i,j}) n_i \quad \text{EQ8}$$

$$\sum_{i=1}^{N_p} (pc_{i,j}) n_i = w_j + r_j \quad \text{EQ9}$$

$$r_j \geq 0 \quad \text{EQ10}$$
$$\forall\ j = 1, 2, \ldots, S$$

$$n_i \geq 0 \quad \text{EQ11}$$
$$\forall\ i = 1, 2, \ldots, N_p$$

Where, $c_j$ is the cost or length of span j. The PC design generated with this IP is able to fully restore any failed network span using only PC paths. Other variables are as in the prior IP. Note that since this IP generates the $s_j$ values the prior Eq. 2 changes now to an equality (in Eq.8) from an inequality.

C. Adaptation of the General Formulation for Closed Path-Oriented PC-IP Designs

In this section, the first general IP formulation given above is used with a set P containing only distinct closed paths of the network graph. The constraints and objective function required for use in an IP are given by Eqs. 1 to 6. However, it is required that the coefficients $pc_{i,j}$ and $spc_{i,j}$ be evaluated for the closed paths contained in the pattern set. The coefficients $w_i$ and $s_i$ are set by the network working and spare capacity placement plan. $spc_{i,j}$ is equal to the number of spare links required on span j to build a single copy of pattern i. For a closed path i in P $spc_{i,j}$ can be either 0, 1 or 2, as illustrated in FIGS. 1A and 1B. It is zero if either of the failed span end nodes are not on the closed path (eg. for span L34). It is one if both of the span end nodes are on the closed path and the end nodes of the failure are also adjacent to one another along the closed path (FIG. 1A). $pc_{i,j}$ is two if both of the failure span end nodes are on the closed path but are not adjacent to one another on the closed path (FIG. 1B).

The second general IP method given above to generate the minimal sparing for 100% PC restorability can also be used with a set P containing only closed paths. The constraints and objective function are given by Eqs. 7 to 11 and the coefficients $pc_{i,j}$ and $spc_{i,j}$ are evaluated in advance as above for the closed paths contained in pattern set P.

D. Results of IP-1 and IP-2 Closed Path-Oriented PC Designs

The set P used in the test networks, for both of the closed path-oriented IP design approaches, included all distinct closed paths up to a maximum hop length of infinity for test networks 1, 2 and 3. For Networks 4 and 5, the maximum closed path length was 12 and 25 hops respectively. This means that for Networks 1–3 the complete set of all possible closed paths was included in the designs. For Networks 4 and 5, the limiting closed path lengths are still quite high; certainly at or above practical limits that we might expect for PC deployment. The IPs were run to completion for test networks 1, 2 and 3 with CPLEX 3.0 (CPLEX Optimization Inc., Using the CPLEX Callable Library—V3.0, Suite 279, 930 Tahoe Blvd., Bldg. 802, Incline Village, Nev. 89451), and so, for these test networks, the result is optimal. In networks 4 and 5, the CPLEX runs terminated before true completion of the IP engine because they ran out of memory. The design solutions returned are, therefore, the best feasible designs found prior to the point of memory exhaustion by CPLEX.

An example of the closed path-oriented PC patterns generated in test network 1 is shown in FIGS. 2A–2D. The restorability performance with closed path-oriented PC design, including the 2-step restorability in the existing. spare capacity (IP-1), is given in Table 1. There is no corresponding table for IP-2 closed path PC design as every network is 100% PC restorable and there is no case of 2-step restorability. For the design of PC closed path plans within an existing KSP sparing plan (IP-1), the PC restorability ranged from 75% to 97% in the test networks. The low of 75% in Network 4 may be due to the relatively restricted closed path set and partial CPLEX termination result. A hop limit of 12 was necessary to control the size of the closed path-set (P) in the presence of the high average nodal degree of this network. The remaining networks had PC restorabilities in the range of 94% to 97%. The overall restorability, using PC restoration first, followed by 2nd-step KSP restoration, was from 94% to 99%.

The comparison of crossconnection workloads in IP-1 and IP-2 designs is in Table 2. With the IP-1 designs, there is still a mixture of crosspoint assertion and crosspoint opening actions required although the total crossconnection make workload is 76% to 100% lower than the total crossconnect closures required for KSP restoration. In the second half of Table 2, however, we see the remarkable operational property implied by the IP-2 type designs: 100% restorability is achieved solely through unmaking connections to isolate the desired restoration path segments. There is also an unavoidable minimum action of making one crossconnection per demand unit to substitute traffic into the restoration paths at the failure end nodes (these traffic substitution crossconnections are fundamentally common to all possible restoration schemes).

Table 3 shows the capacity cost of this type of design (IP-2) relative to the KSP baseline. Table 3 shows that the IP-2 designs appear to still be highly capacity efficient. The total extra spare capacity to support 100% restorability through preconfigured closed paths ranged from zero to 18.5%. Although again, the largest increase in sparing requirement occurred for Net4 where the CPLEX design did not reach its optimal termination. In practise, aside from Net4, these results suggest that with closed path-oriented preconfiguration of spare capacity, 100% of the required restoration paths can be preconfigured in advance of failures, often without significantly more total sparing than a conventional span-restorable network requires.

Implementation of Closed Path Pre-configured Network

A distributed preconfigured closed path design (DCPC) algorithm, which can be run in a network's nodes, is presented. The algorithm is distributed in the sense that its execution is spread amongst the significant processing power present in the DCS machines which form a mesh network's nodes. A network's nodes can execute the algorithm using only the information which is available locally at each node. This algorithm is a heuristic so the results are not guaranteed to be optimal but, for the advantage of being to design a PC plan using only the processing power present within the network, sub-optimal designs may be acceptable.

Figure 3:
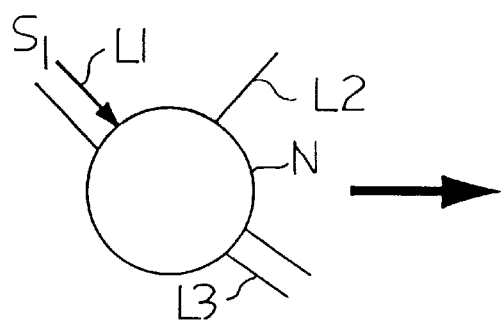
FIG. 3 shows a node of a network with a single incoming statelet arriving on one link of a span represented as having two links, wherein the node is of degree three and has two other spans, one of which has a single spare link and the other of which has two spare links.
Figure 4:
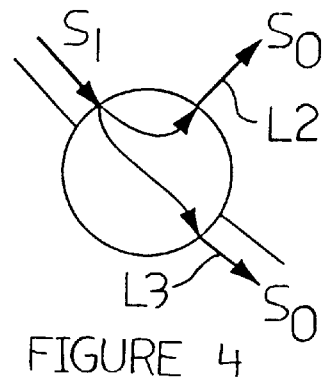
FIG. 4 shows the node of FIG. 3 broadcast to the largest extent possible.

This DCPC algorithm is based on the selfhealing network (SHN) protocol described in U.S. Pat. No. 4,956,835 issued Sep. 11, 1990. Both the SHN protocol and the DCPC method implement a distributed algorithm which generates efficient path sets for span restoration and both use statelet based processing. A statelet is embedded on each network link (as for example link L1 in FIG. 3) and contains the current state of the link as described by a number of fields. A link is a bidirectional signal carrier and, so each link, viewed locally by a node N (FIG. 3), may have both an incoming statelet and outgoing statelet. As shown in FIG. 3, an incoming statelet arrives at a node N on a link L1, and originates from the adjacent node connected to the receiving node through the link. An outgoing statelet $s_0$ is broadcast from a node, such as node N in FIG. 3, through a link, such as link L3 (FIG. 4), and arrives at the adjacent node which is connected to the broadcasting node through the link.

Each outgoing statelet has, in general, an incoming statelet which forms its precursor. $s_0$ in FIG. 3 is an outgoing statelet for which $s_1$ is the precursor. An incoming statelet forms a precursor to an outgoing statelet if the incoming statelet was broadcast to form the outgoing statelet. In other words, an incoming statelet which forms the precursor of an outgoing statelet is the source for the outgoing statelet. An incoming statelet can be the precursor for many outgoing statelets but an outgoing statelet can have only one precursor incoming statelet.

As a statelet is broadcast throughout a network, it forms a statelet broadcast tree which, at each node in the tree, is rooted at the precursor incoming statelet from which the outgoing statelets are propagated. The particular route which a statelet travelled from the sender node to its present location is called the statelet broadcast route.

The distributed algorithm operates by the application of a set of rules at each node which preferentially broadcast certain incoming statelets over others. Each node acts only on the basis of information available to it but the interaction of the nodes, actions results in the generation of a solution which is efficient at a global level.

Statelet Format

Figure 20A:
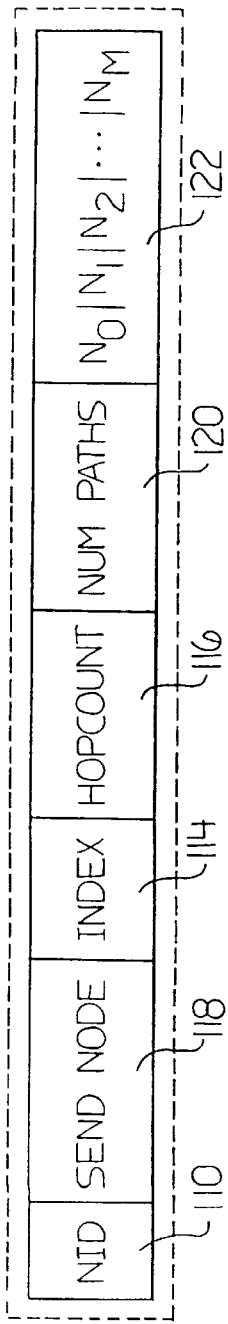
FIGS. 20A–20C illustrate the content and organization of information in the signature registers shown in FIG. 19 according to a preferred embodiment of the present invention.
Figure 20B:
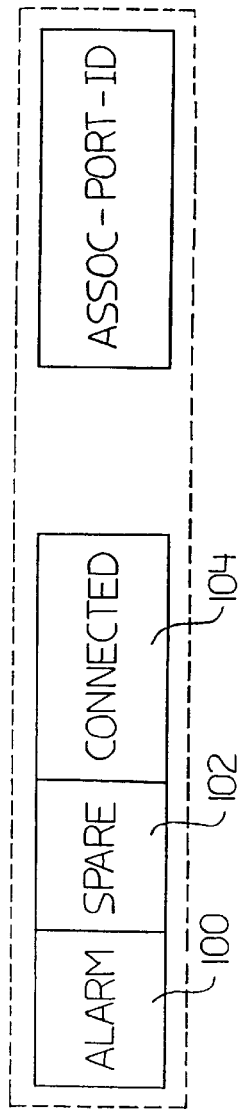
Figure 20C:
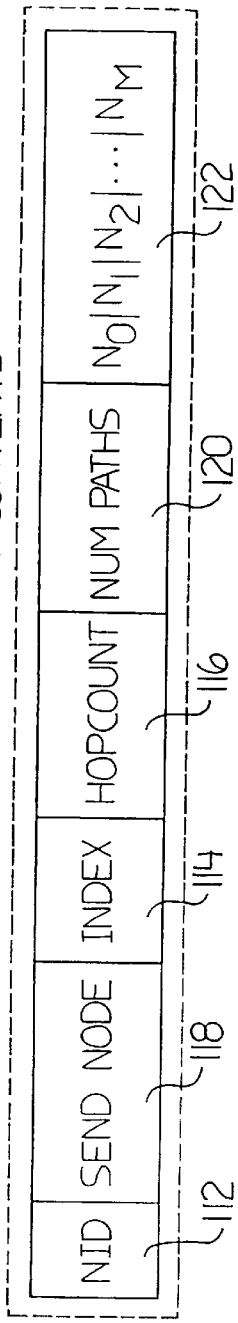

The statelet format used in the DCPC algorithm has 6 main fields as shown in FIGS. 20A–20C:

node ID field 110 and 112: There is only one basic format of restoration signature in this invention, but it is interpreted slightly differently depending on whether it is a "transmit signature" or a "receive signature". Every transmit signature becomes a receive signature at the opposite end of the link on which it is transmitted. Each port of nodes in the network has provision for one transmit signature and one receive signature. The field NID(Node Identifier) is written to a transmit signature by the node sending that signature and contains the network-wide identifier of the node originating the signature. This NID field appears in the NID field 110 of the corresponding receive signature at an adjacent node. The NID field is used so that each DCS machine can recognize the grouping of links arriving at its site into logical spans to the same adjacent node by associating all links with equal receive signature NID fields into a logical span for control logic purposes.

An alternative implementation is to store data at each DCS about the facility spans terminating at its site in which case NID's are not needed. However, the NID-based embodiment is preferred because it is consistent with an objective of the present invention that all information needed by each node to perform the invention comes to that node through the network connections themselves, thereby continually being up-to-date and eliminating the significant practical problems of maintaining accurate real-time distributed network configuration databases at each node.

index field 114: Each statelet belongs to an index family. At a node, when an outgoing statelet is broadcast from an incoming statelet, the outgoing statelet's index field is set equal to the index field of the incoming statelet from which it was broadcast.

hopcount field 116: As a statelet is relayed from node to node, a count of the number of hops it has taken is maintained. The hopcount in an incoming statelet is equal to the number of times that the statelet has been relayed by previous nodes to reach the node at which it has arrived.

sendNode field 118: All statelet broadcasts originate at a single node which acts as the sender node for the network. The sendNode field is set equal to the name of the sender node, and is the same for all statelets in the network.

numPaths field 120: As a statelet is relayed through the network, the number of useful PC paths which the statelet could provide if it could successfully loop back to the sender node to form a closed path, is evaluated. This field, in an incoming statelet, is set equal to the value which was evaluated at the node from which the incoming statelet originated.

route field 122: This field contains the route (sequence of successive nodes), from the originating node, which a statelet broadcast followed to become an incoming statelet at a particular node. This field is preferably an appended list of the nodes in order that the statelet visited the nodes. Alternatively, and equivalently, the field may be a vector with a size equal to the number of nodes in the network. Each node in the network is represented by a cell in the route vector. Each cell corresponding to a node contains the name of the node which was the predecessor of the node along the route. That is, the cell corresponding to a node points back to the node which fell before the cell node on the route. If a node does not fall on the route then its cell is set equal to NIL. As a node broadcasts a statelet to an adjacent node, the route field is updated so that the receiving node's cell points to the broadcasting node. Using the route vector allows the route, which was taken by a statelet broadcast to reach a particular node, to be traced back to the sender node.

These 5 fields form the basis of the statelet used in the distributed PC closed path design method.

Broadcast Protocol

In the SHN protocol there are three node roles: that of the sender, the chooser and the tandem nodes. The sender node is the source of the broadcast pattern and the chooser node is the recipient of the broadcast pattern. The tandem nodes in the network relay received statelets according to the rules of the SHN protocol. The SHN protocol is concerned with the restoration of a span failure at the span level. The end nodes on a failed span become the sender and chooser nodes (which end node takes on which role is chosen in an arbitrary manner.) All other nodes become tandem nodes as broadcast statelets reach time. So in summary, the sender node initiates a statelet broadcast pattern, the tandem nodes relay the broadcast pattern according to the SHN protocol, and the chooser node receives the broadcast pattern. When the chooser receives an incoming statelet, then there exists a restoration path for the failed span. The path is found by tracing the exact link-level path that the statelet followed from the sender to reach the chooser in a process called reverse linking.

However, in the DCPC algorithm, the objective is different from that of the SHN protocol. In the SHN, it is required that paths joining the end nodes of a failed span be found, in order that the span be restored. In the DCPC algorithm, it required that closed paths which are effective, preferably maximally effective, at providing PC paths, over all possible span failures, are to be found. The node roles in the DCPC algorithm are modified to reflect that closed paths are to be generated rather than point to point paths. In the DCPC, there are two possible node types: originating nodes which source and receive the statelet broadcast pattern, and tandem nodes which relay the broadcast statelet pattern.

The originating or "cycler" node initiates the statelet broadcast, the tandem nodes relay it according to the DCPC algorithm's statelet processing rules, and, eventually, the statelet broadcast pattern loops back to touch the originating node. At this point, there exists a set of successive nodes (the originating node and several tandem nodes) capable of forming a closed path in the network which the originating node can choose to select as a closed path for pre-configuration. The closed path is defined by following the route taken by the statelet broadcast pattern to return back to the originating node. However, the originating node does not immediately take the closed path indicated by the first incoming statelet it receives. Instead, it samples the incoming statelets and updates a record of the best received closed path each time it receives a new incoming statelet. When there is no further improvement in the best received closed path, the originating node terminates the statelet broadcast and initiates the construction of a single link-level copy of this closed path. Each initiation of a statelet broadcast by a originating node eventually results in the construction of a closed path (if a closed path exists).

The bulk of the processing takes place in the tandem nodes of a network in both the SHN protocol and the DCPC algorithm. The tandem nodes determine what the actual shape of the statelet broadcast pattern will be through the repeated application of the statelet broadcast rules locally at each node.

The basic statelet broadcast rule is quite simple; for each incoming statelet, try to broadcast a single outgoing copy of it on a spare link, whose outgoing side is unoccupied, on each span except for the span on which the incoming statelet arrived. This is a simple broadcast of an incoming statelet and attempts to broadcast the statelet to the largest extent possible. Simple broadcasts of incoming statelets typically only happen at the start of the originating node's initiation of the statelet broadcast because a single incoming statelet can be broadcast to form the precursor of multiple outgoing statelets and, as the tandem nodes relay incoming statelets, the spare link's outgoing sides, at each node, are quickly occupied by outgoing statelets. Refer to FIG. 3 for an example of a simple broadcast of an incoming statelet. In the example, a single incoming statelet, $s_1$ arrives on the incoming side of spare port of node N. There are no other incoming statelets present at the node N, so the incoming statelet $s_1$ is broadcast to the largest extent possible, forming the precursor of a single outgoing derivative statelet $s_0$ on each network span connected to the node N (except the span on which the incoming statelet arrived,) as for example links L2 and L3 shown in FIG. 4. The statelet on each of the links L2 and L3 are identical to each other, but differ from $s_1$ in that the hopcount, numpaths and route fields in $s_0$ have been updated from their values in $s_1$.

A modification to the simple statelet broadcast is the score based statelet broadcast. With the addition of this rule, an incoming statelet is broadcast to the largest extent possible prioritized by a score which is assigned to it (the rules which evaluate the score are discussed in the next section.) If multiple incoming statelets are present at a node then the statelets compete, on the basis of their scores, for a maximum statelet broadcast. A consequence of a node's incoming statelets being broadcast on the basis of their scores is that if a superior statelet arrives at a node and there are no free spare links available, on one or more spans, then the incoming statelet, on each span with no unoccupied spare link, displaces the single outgoing statelet whose precursor has the worst score. An incoming statelet can be broadcast on a span in one of two ways. The first way is by simple broadcast, which happens if there is a least one spare link on the span whose outgoing side is unoccupied by a statelet. The second way is by displacing an outgoing statelet whose precursor's score is both worse than the score of the incoming statelet being considered for broadcast, and, also, the worst of the scores of all the incoming statelets which form a precursor to an outgoing statelet on the span. If there is no spare link, on a span, whose outgoing side is unoccupied and the incoming statelet's score is not good enough to displace an existing outgoing statelet, then the incoming statelet will not be broadcast.

Figure 5:
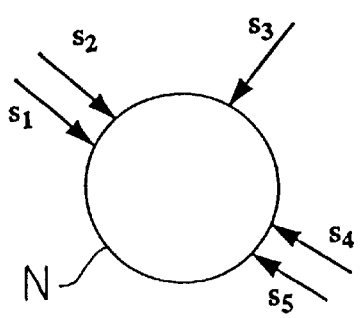
FIG. 5 shows the node of FIG. 3 with five incoming statelets.
Figure 7:
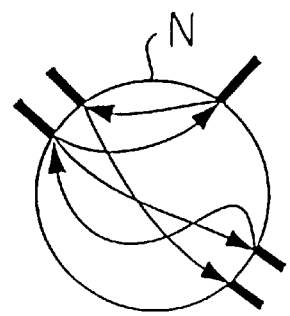
FIG. 7 shows the resulting overall statelet broadcast pattern for the node shown in FIGS. 3–6E.
Figure 6A:
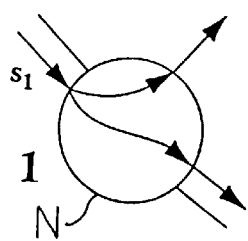
FIGS. 6A–6E show respectively the broadcast of statelets $s_1$–$s_5$ in order of relative ranking of the score of the statelets.
Figure 6B:
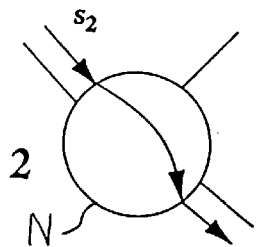
Figure 6C:
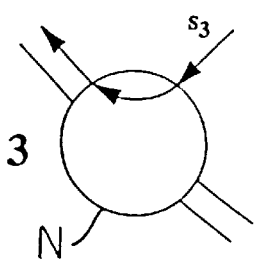
Figure 6D:
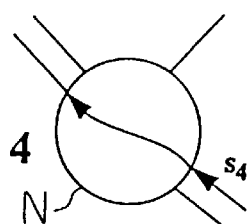
Figure 6E:
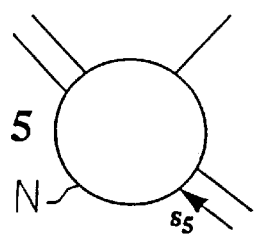

This competition among the incoming statelets distributes the limited number of outgoing statelet positions among the incoming statelets with preference given to those statelets with good scores. The statelet broadcast pattern, at a node, is updated continuously as new incoming statelets appear. However, the overall pattern has the same appearance as if the following procedure was followed. First a list of incoming statelets is formed, for example statelets $S_1$–$S_5$ in FIG. 5, and evaluated to assign each statelet a score. Next the list is sorted so the statelets are ordered from best score, at the start of the list, to worst score, at the end, for example $S_1$–$S_2$–$S_3$–$S_4$–$S_5$. Next, as shown in FIGS. 6A–6E, the incoming statelets are broadcast, without statelet displacement, sequentially as each appears in the list, to the fullest extent permitted by the unoccupied outgoing side of the spare links in the network. The result of applying this procedure is that high scoring incoming statelets are fully broadcast, medium scoring incoming statelets are partially broadcast, and low scoring incoming statelets may not be broadcast at all. This is analogous to the "compete" procedure in the SHN. The final broadcast pattern reflects the preference given to better scoring incoming statelets. $S_1$ is fully broadcast to form the precursor of two outgoing statelets as shown in FIG. 6A. $S_2$, $S_3$, and $S_4$ are only partially broadcast to form the precursor of one outgoing statelet as shown in FIGS. 6B–6D. $S_5$ is not broadcast and forms the precursor for no outgoing statelets as shown in FIG. 6E. The final broadcast pattern is shown in FIG. 7.

Figure 8A:
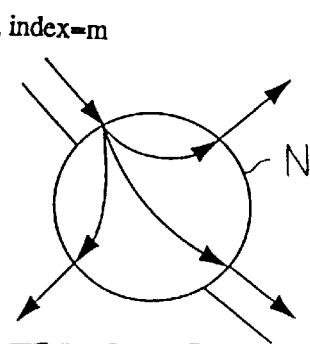
FIG. 8A shows a node with a single incoming statelet $s_1$ belonging to index m.
Figure 8B:
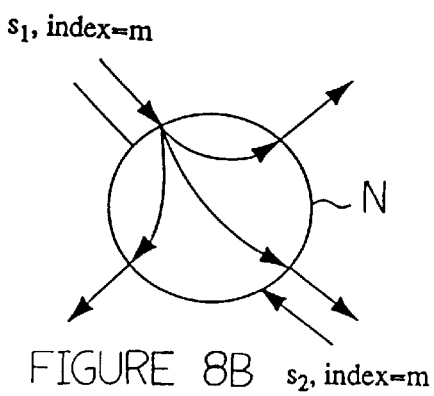
FIG. 8B shows the node of FIG. 8A with a second statelet $s_2$ arriving at the node, in which the statelet $s_2$ belongs to the same index m as the statelet $s_1$ and has a better score.
Figure 8C:
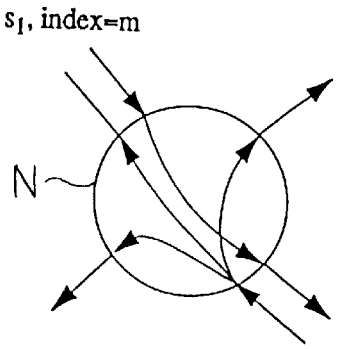
FIG. 8C shows the node of FIGS. 8A and 8B with $s_1$'s statelet broadcast shifted to $s_2$.

As previously mentioned, each statelet belongs to an index family. When an incoming statelet is broadcast to form an outgoing statelet, the index to which the incoming statelet belongs is also assigned to the outgoing statelet. All statelets of a common index in a network can be traced back to and are derived from a single outgoing statelet, at the originating node, which forms the basis of that index family. As incoming statelets are broadcast to form the precursor of multiple outgoing statelets, it can occur that multiple incoming statelets can appear at a node that all belong to the same index family. An additional rule, which is added to the broadcast rules of a tandem node, is that there can only be one outgoing statelet, which belongs to a particular index family, on any given span. The broadcast rules are processed, as previously described, with preference given to those incoming statelets with the best scores but there is an additional requirement that only a single outgoing statelet of any given index family can exist on any span. The incoming statelet, which forms the precursor of this outgoing statelet, has the best score of all incoming statelets of that index family which could potentially broadcast an outgoing statelet on that span. This rule requires that a new incoming statelet displace a pre-existing outgoing statelet of the same index family, if the new incoming statelet would form a superior precursor. This has the effect of shifting the broadcast pattern for a particular index family from the original precursor statelet to the superior incoming statelet. Refer to FIGS. 8A–8C for an example of the arrival of a superior incoming statelet $s_2$ where an incoming statelet $s_1$, of the same index family, exists. In FIG. 8A, N has a single incoming statelet $s_1$ belonging to index m. In FIG. 8B, statelet $s_2$, also belonging to index m, arrives at node N with a better score. As shown in FIG. 8C, $s_1$'s statelet broadcast is shifted to $s_2$. Thus, arrival of a superior incoming statelet $s_2$ at the node causes the broadcast pattern to be shifted from the previously present $s_1$ to $s_2$. $s_1$'s broadcast on $s_2$'s incoming span is unchanged because a statelet may not be broadcast on its incoming span. $s_2$ broadcasts an outgoing statelet on $s_1$'s incoming span because there is a spare link available on the span.

Figure 9:
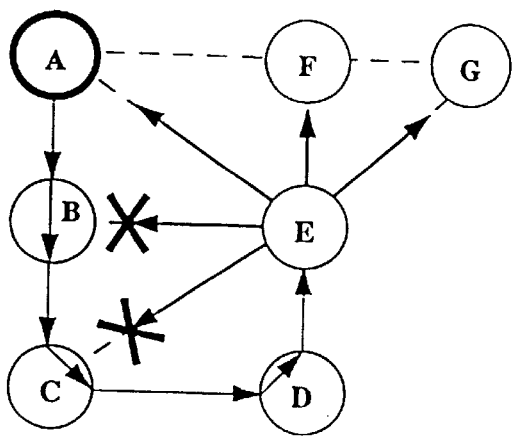
FIG. 9 shows an example of a tandem or intermediate node statelet broadcast, illustrating that only simple closed paths are generated which visit an originating rode only once.

The final broadcast rule is that an incoming statelet may not be the precursor of an outgoing statelet on a span which connects the node, where the incoming statelet arrived, to a node which touches the incoming statelet's broadcast route. This route is stored in the route field of the incoming statelet. The goal of the DCPC protocol is to generate closed paths for preconfiguration by evaluating the statelet broadcast patterns which originate and end at the originating node. In order that only simple closed paths be generated (that is closed paths which traverse each originating node only once), the statelet broadcast at the tandem nodes is limited to nodes not previously touched by the incoming statelets broadcast route. The only case where an outgoing statelet may be broadcast to a node falling on the broadcast route is when a tandem node broadcasts to the originating node. This is required so that the statelet broadcasts may form closed paths by terminating on the originating node. Refer to FIG. 9 for an example of the valid spans a tandem node may broadcast an incoming statelet on. An existing statelet broadcast travels from the originating node A to tandem node E along route A–B–C–D–E. The incoming statelet arriving at tandem node E can be broadcast to nodes A, F, or G. Nodes F and G are valid broadcasts as they are tandem nodes which have not previously been touched by the statelet broadcast pattern. Node A is a valid broadcast because it is the originating node. Nodes B and C are not valid as they have previously relayed the statelet broadcast. If an outgoing statelet was sent to the originating node, the statelet broadcast pattern would form a closed path following A–B–C–D–E–A. Following this rule ensures that the successive notes along which a statelet is broadcast are not capable of forming a closed path that does not include the originating mode.

In summary, a tandem node's statelet broadcast rules broadcast each incoming statelet to the largest extent warranted by the statelet's evaluated score. If all spare links on a span are occupied by outgoing broadcast statelets and an incoming statelet, with a good score, is able to broadcast on the span but currently does not, then the incoming statelet can displace the outgoing statelet whose precursor statelet has the worst score of all precursors for the span. An incoming statelet may only form the precursor for an outgoing statelet whose destination is a node which has not been previously touched by the incoming statelet's statelet broadcast route. The single exclusion to this rule is that an outgoing statelet may be broadcast to the originating node. An additional rule is that only a single outgoing statelet of a given index family may appear on a span. If multiple incoming statelets exist, which are of a common index family and are able to be broadcast on a span, then the statelet with the best score is broadcast. These rules result in the originating node receiving incoming statelets whose statelet broadcast route traces out closed paths which begin and terminate at the originating node.

In the previous section a description of how a tandem node broadcasts incoming statelets on the basis of each statelet's evaluated score was given. In this section it will be described how an incoming statelet is assigned a score.

Statelet Ranking

The DCPC protocol attempts to generate effective PC designs using closed paths as PC elements. To generate good closed paths a score is required which reflects the quality that makes a particular closed path effective at providing span failures with PC paths. The score is chosen to reflect the potential that an incoming statelet's broadcast route can form a PC closed path with a high ratio of number of effective PC restoration paths to number of spare links required to construct it to provide PC paths for span restoration.

When an incoming statelet first arrives at a tandem node, the tandem node must first evaluate the statelet'score before it can attempt to broadcast the statelet. The statelet's score is equal to the ratio of the number of useful PC paths that the closed path, formed from a union of the incoming statelet's broadcast route and an imaginary span joining the tandem node and the originating node, can provide and the number of spare links which would be required to form the statelet's broadcast route. The number of useful PC paths contained in the closed path are only counted for real network spans and are not considered for the imaginary span which closes the closed path (unless the imaginary span should coincide with a real span.) The number of spare links required to form the broadcast route can also be viewed as the number of spare links required to form the closed path when not considering the imaginary span. This score measures the potential that an incoming statelet's broadcast route, as evaluated locally at the tandem node, would form an effective PC closed path if it should loop tack and touch on the originating node.

The count of the number of PC paths which a statelet broadcast route could provide, if it was shorted out to form a closed path, is updated incrementally as the statelet broadcast route is relayed from tandem node to tandem node. When a tandem node receives an incoming statelet it evaluates the number of PC paths which were added in the step between the incoming statelet's originating node and itself. This number is added to the total PC paths, as evaluated at the originating node, which is contained in the incoming statelets numPaths field, to form a local numPaths value for the incoming statelet. The local numPaths number is divided by the value of the incoming statelet's hopcount field to generate the incoming statelet's score. If the incoming statelet should form the precursor to an outgoing statelet, the outgoing statelet's numPaths field is set equal to the incoming statelet's evaluated local numPaths.

The PC path increment required to form the local path count for an incoming statelet is evaluated by examination of the statelet's route field. If the route touched on any of the nodes which are adjacent to the tandem node then the incoming statelet's route could provide PC paths for the spans which connect the tandem node to adjacent nodes. The rule used to evaluate the number of PC paths which are provided to a span connecting the tandem node to an adjacent span is quite simple. If a span connects the tandem node to a node, which is present in the route field, then the statelet broadcast route could provide one or two preconfigured paths; if the node is not present, the route can provide no paths. If the node is present, the route can provide only a single PC path if the adjacent span is that on which the incoming statelet, belonging to the broadcast route, arrives. The route can provide two PC paths if the span connects the tandem node to an adjacent node which is on the route but is not directly behind the tandem node on the route. The case where no PC paths are provided, occurs because there is no path possible in a closed path for a pair of nodes which are not both a part of the closed path. The case, where a single PC path is available, occurs when a span, which connects a pair of originating nodes directly along the closed path, fails because the only path possible is that which connects the pair of nodes around the failed span. The case, where two PC paths are available, occurs when a span, which connects a pair of originating nodes but is not directly on the closed path, fails because there are two paths possible between any pair of nodes on a closed path, and, in this case, the closed path is not broken by the failure of a span. Therefore, unlike in the previous case, both paths can be exploited to aid in restoring the span failure. It should be noted that the total number of PC paths provided by a statelet broadcast route is not what is calculated but the total number of useful PC paths. If an incoming statelet's broadcast route is evaluated and it is found to overprovide a span with PC paths, either because the span has very few working links or the span's working links have been provided PC paths by previously formed closed paths, then only the number of paths which are useful to restoring a span are counted. It can be determined if a PC path would be useful in restoration because each node maintains a list of the number of uncovered working links on the spans which join it to other nodes and this list is updated as PC closed paths are formed in the network.

Figure 10A:
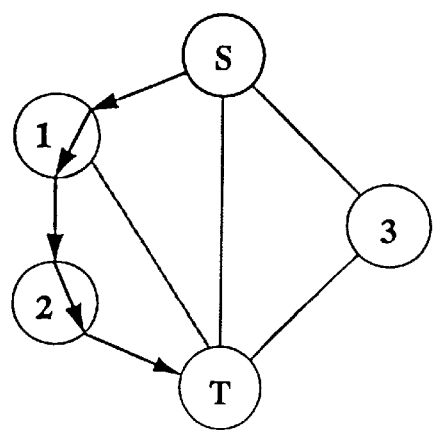
FIGS. 10A–10F illustrate how a tandem node evaluates and updates the incremental preconfigured path count of an incoming statelet for a network with nodes S, 1, 2, T and 3.
Figure 10B:
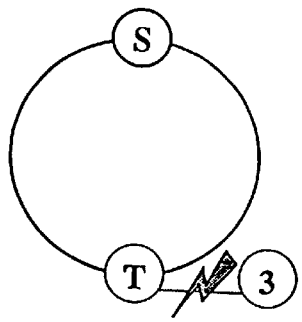
Figure 10C:
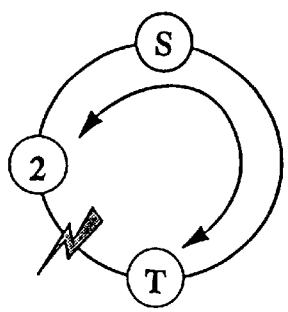
Figure 10D:
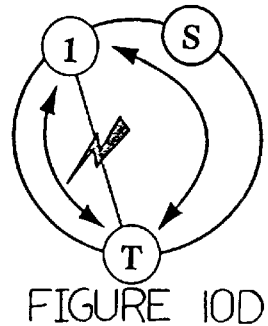
Figure 10E:
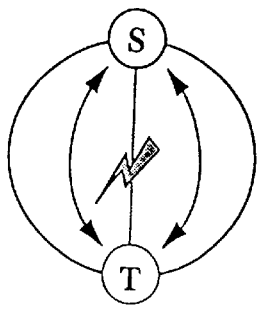
Figure 10F:
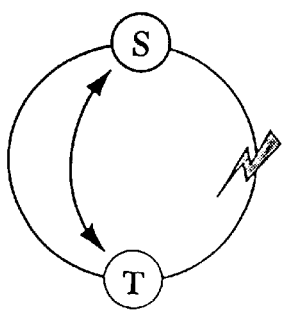
Figure 11:
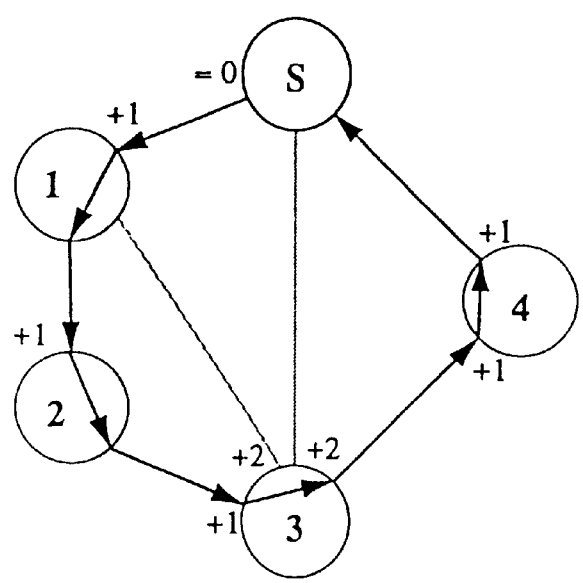
FIG. 11 illustrates the evaluation of the total PC path count by the tandem nodes along a statelet broadcast route.

The method used in the previous paragraph to evaluate the total PC path count for an incoming statelet is valid only when considering the incoming statelet for broadcast to another tandem node. If a statelet is being considered for broadcast on a span which connects the broadcasting tandem node to the originating node then the total PC count must be evaluated in a slightly different manner. The rules given in the previous paragraph are valid except that the number of PC paths which are available for a span, which has the originating node as an end node, can be at most one. This is because when an outgoing statelet is broadcast to the originating node, it is closing the statelet broadcast route to form a closed path. The span connecting the broadcasting tandem node to the originating node falls directly beneath the closed path formed by the broadcast route and a closed path can provide only a single PC path to the failure of such a span. This difference requires, in effect, that a tandem node evaluate two different scores for each incoming statelet: a score to be used for broadcast to other tandem node, and a score to be used for broadcast to the originating node. Both scores are still calculated by taking the ratio between the total PC paths, as calculated locally, to the value of the incoming statelet's hopcount field. Refer to FIGS. 10A–10F and 11 for examples of how the total PC path count is evaluated and updated at successive tandem nodes along a statelet broadcast route. In FIG. 10A, an incoming statelet arrives at node T with broadcast originating at originating node S. The statelet's broadcast route is S-1-2-T. Tandem Node T evaluates PC paths added for the spans joining it to adjacent nodes. Potential failed spans which are considered by Node T are T-2, T-1, T-3 and T-S. PC paths are found for the closed path formed from the union of route S-1-2-T and a span joining node T to the originating node S. As shown in FIG. 10B, there are no PC paths in case of failure of span T-3. As shown in FIG. 10C, there is one PC path in case of failure of span T-2. As shown in FIG. 10D, there are two PC paths in case of failure of span T-1. As shown in FIG. 10E, there are two PC paths when a broadcast is made to a tandem node in case of failure of span T-S. As shown in FIG. 10F, there is one PC path when a broadcast is made to the originating node in case of failure of span T-S. In FIG. 11, a statelet broadcast reaches the originating node with Route S-1-2-3-4-S. As each tandem node receives the statelet broadcast it increments the total preconfigured path count. The total number of preconfigured paths for S-1-2-3-4-S is equal to 9 (0+1+1+(1+2+2)+1+1=9). One PC path is available for the failure of a closed path span. Two PC paths are available for a non-closed path span whose end nodes are originating nodes.

Initiation of Statelet Broadcast

All statelet broadcasts originate at the originating node. To initiate statelet broadcast, the originating node places a single outgoing statelet on an available spare link on each span falling on the originating node. Each outgoing statelet is assigned a unique index. If a span does not have an available spare link, either because the span has no spare links or because the span's spare links have been previously used to form PC closed paths, then no outgoing statelet is placed on it. Each outgoing statelet has its sendNode field set to the name of the originating node, its hopcount field set to a value of 1 hop, and its numPaths field set to zero. Also, each outgoing statelet has its route field set to contain only the name of the originating node, or equivalently in the alternative manner set forth herein for establishing the route field, all the cells in the route field are set to NIL except for the contents of the cell, corresponding to the node which receives the outgoing statelet, which is set to the name of the originating node.

After initiation of statelet broadcast the originating node initiates the sampling of incoming statelets.

After the statelet broadcast is initiated, the originating node waits and samples the incoming statelets arriving on its spare links. Each successful arrival of an incoming statelet represents a set of successive nodes capable of forming a closed path with a score attached to that closed path. The score for each incoming statelet is found by taking the ratio of the incoming statelet's numPaths field to that of its hopcount field. The value is equal to the number of useful PC paths which the closed path can provide per spare link which would be required for its construction. At the start of statelet sampling the closed path resets a timer and then waits. As new statelet events arise on the incoming sides of the originating node's spare links, it examines the new incoming statelet and determines its score. If the closed path represented by the new statelet has a score which betters the scores of all previously received statelets, the originating node records the closed path and its score and resets the timer. When the timer times out, the originating node initiates the building of the best non-zero scoring closed path which it has received. If the originating node has either received incoming statelets which have a score of zero or has received no incoming statelets at all, the originating node does not initiate the building of a closed path. Instead, it terminates its role as the originating node and signal another predetermined node to assume the role of the originating node.

This sampling of incoming statelets is markedly different from the way received incoming statelets are treated by the chooser node in the SHN protocol. Immediately upon reception of an incoming statelet, the chooser node reacts by initiating reverse linking, back along the incoming statelet's broadcast path, to form a restoration path between the sender and chooser nodes. The reason for this is that a statelet broadcast in the DCPC protocol tends to improve in its score as it progresses unlike in the SHN where a statelet broadcast tends to worsen in score. This difference is a consequence of the different goals of the two protocols. The SHN uses statelet broadcasts to represent node to node paths, between the sender and chooser nodes, and, in general, a shorter path makes more efficient use of network spare capacity than a longer path and is more reflective of the real time pressure in restoration. Therefore, a SHN statelet broadcast's score worsens as it progresses and becomes longer. As shown in the previous section, a closed path tends to contain more PC paths as it grows in size and, therefore, the score of a DCPC statelet broadcast, which represents a closed path, improves as it increases in size. This means that reacting immediately to an incoming statelet in the DCPC protocol gives, in general, a closed path which does not have a very good score. Sampling the incoming statelets forces the originating node to give the generation of incoming statelets, with better scoring broadcast routes, a chance to occur. The DCPC has the luxury of permitting the sampling of signatures because it is being run in anticipation of a span failure, and not in response to one, and so does not require the fast real time response present in the SHN.

If the originating node has found a non-zero scoring closed path in the statelet sampling stage, it initiates the building of a single copy of the closed path. As mentioned in the previous section, a statelet broadcast in the DCPC protocol improves in score as it progresses. A consequence of this is that there is no guarantee that the actual link level path, that an incoming statelet's broadcast path traversed to reach the originating node, will still be occupied by the statelet's broadcast. Because a statelet broadcast's score improves as it progresses there is nothing to protect its root from being displaced by other better scoring statelet broadcasts in the tandem node broadcasts rules. At each tandem node, a statelet broadcast builds upon the statelet broadcasts preceding it at other tandem nodes. The relatively low scoring portion of the broadcast occurs earlier in the broadcast route and can be displaced by the arrival of new higher scoring incoming statelets at the preceding tandem nodes. A consequence of this is that the network wide statelet broadcast pattern will not eventually grow static, unlike in the SHN protocol, but continues to fluctuate as the roots of broadcast patterns are continuously displaced by the arrival of better scoring statelets. However, in the previous sampling stage, the originating node samples the incoming statelets and maintains a record of the best scoring closed path. The record contains only the route the closed path's statelet broadcast travelled to reach the originating node, not the actual path, but this is all that is required to build a single copy of the closed path. It is guaranteed that the spare capacity required to construct a copy of the closed path will be available because the closed path's statelet broadcast route was only broadcast on unoccupied spare links.

Building a Closed Path

The first step in initiating the construction of a closed path, is that the originating node cancels all outgoing statelets. This causes a termination of the statelet broadcasts as the originating node is the source of all statelet broadcasts within the network. In effect, although the statelet broadcasts would continue to fluctuate if left to proceed, the originating node brings the statelet broadcasts to a conclusion. Next, the originating node examines the route field which was stored for the closed path. The cell corresponding to the originating node contains the name of the tandem node which preceded the originating node on the broadcast route. The originating node then scans for the first unoccupied spare link on the span joining the originating node to the node indicated by the route field. The originating node then places an outgoing statelet, on this spare link, with a copy of the closed path's route field and a special reserved index family which indicates the outgoing statelet is not a normal statelet broadcast but a closed path construction request.

The tandem node, upon reception of the closed path construction statelet from the originating node, cancels all outgoing statelet broadcasts. Then it examines the route field on the construction request statelet for the name of the tandem node which preceded it on the closed path's original broadcast route. It then locates the first unoccupied spare link on the span joining it to the node which preceded it on the broadcast route. Next, an outgoing construction request statelet is placed on this link, instructing the preceding route node to continue construction of the closed path. The tandem node's local list of uncovered span working links is updated, to reflect the PC paths which are available in the newly formed closed path, so that future iterations of statelet broadcasts can be scored accurately. Also, the tandem node forms a crossconnection between the link on which the incoming construction request statelet arrived and the link on which it sent the outgoing construction request statelet. The preceding tandem nodes on the broadcast route reacts in a similar manner, continuing the construction of the closed path.

Eventually, the construction of the preconfigured closed path loops back to the originating node and an incoming closed path construction statelet arrives on a spare link. The originating node then forms a crossconnection between this spare link and the link on which it originally placed the outgoing statelet which initiated the closed path construction thus completing the closed path. The originating node also adjust its local list of uncovered working links in a similar manner to that of the tandem nodes. Finally, the originating node cancels all outgoing statelets, and initiates a new statelet broadcast.

Network Level Representation of DCPC

The previous section gave a network node level description of the DCPC protocol. In this section a network level representation of the protocol's execution will be given. The DCPC protocol is an example of a greedy algorithm. A greedy algorithm is an algorithm which iteratively constructs a solution to a problem on the basis of the state of the problem at the start of the iteration. The state of the problem is modified, after each iteration, by the application of the iteratively generated solution. The DCPC protocol can be seen to be greedy because it iteratively generates a single closed path per iteration and the closed path is formed on the basis of the current network configuration as represented by the number of unoccupied spare links and the number of uncovered working links present in the network spans. As the closed path is generated these network values are modified by the presence of PC paths in the newly generated closed path and the utilization of spare links needed to construct the closed path.

Globally, the DCPC protocol executes in the following manner. Each node in the network takes a turn at being the originating node in an order which is predetermined and is stored locally within the nodes. As each node assumes the role of the originating node, it iteratively generates closed paths, using the rules outlined in the previous section, until it can either no longer generate a closed path or the closed paths that it can generate all receive a zero score. At this point the current originating node gives up the role and signals the next node in the series to become the originating node. The new originating node generates as many closed paths as it can until it too is no longer able to generate useful closed paths. The preconfigured closed paths generated by each node alter the network's configuration as it is seen by later originating nodes. The role of the originating node is successively assumed by all the network nodes and when the last node has terminated its role as the originating node, preconfigured closed path generation stops.

The execution time of this protocol will be many times longer than that of the SHN. This is because a statelet broadcast is required for each generated PC closed path and because of the timer delays introduced by the originating node's sampling of its incoming statelets. However, because the DCPC protocol is being run in anticipation of a span failure event instead of in reaction to one like the SHN, it has the luxury of being able to have a relatively long execution time.

The order in which each node assumes the role of the originating node is important because the originating node can only generate closed paths of which it is a part. Depending on the current network configuration, choosing a certain node to assume the role of the originating node could cause the generation of closed paths which are wasteful in the use of the network spare capacity. An originating node, on which spans fall which require minimal restoration paths, could result in closed paths which are larger than required or which cover spans which do not require many PC paths.

A node order with which this algorithm may be used is determined by the total number of working links falling on each network node. Each network node has a total generated of the number of working links contained in the spans which fall on it. The order in which the nodes assumed the role of the originating node is generated by sorting the nodes in descending order of the calculated working links total. The reverse order is also run to evaluate any performance difference between the two orders. The node's working link total is used to determine the originating node ordering since it seems reasonable that if a node terminates a large number of working links then it should receive an early opportunity to form a part of the PC closed paths generated.

Simulated Implementation

As an initial evaluation of the potential of realizing an algorithm, which could generate preconfigured closed path designs in a distributed manner, a simple simulation approach was taken. The distributed protocol was simulated in an iterative manner with the state of the current iteration being determined by only the state of the previous iteration. In each iteration, the outgoing statelet broadcast pattern, for each network node, is generated on the basis of the node's incoming statelet broadcast pattern in the previous iteration. Each node then assumes its newly calculated broadcast pattern simultaneously and in lockstep. Successive iterations are generated in a similar manner.

This simulation method approximates the case where a network's statelet insertion delay is large compared to the statelet processing delay. Insertion delay is due to the time required to transmit a statelet through a limited bandwidth communication channel while processing delay is due to the time required by the computation element present in each node to process incoming statelet events.

Figure 12:
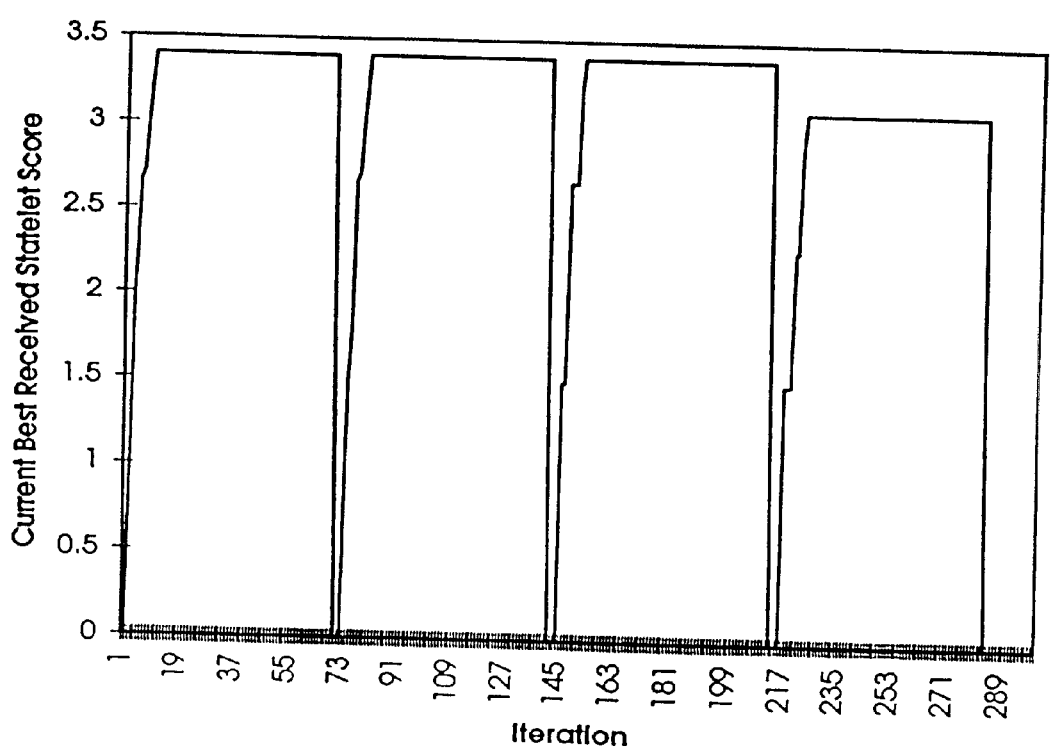
FIG. 12 is a graph showing the best received incoming statelet score at an originating node plotted against a simulation iteration when using DCPC with node order in order of decreasing working links in a sample network (Net1)
Figure 13A:
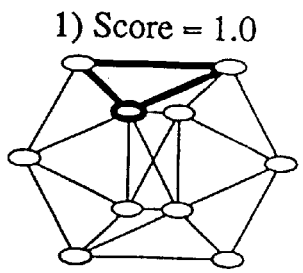
FIGS. 13A–13H illustrate a network with an originating node shown in bold, illustrating the successive displacement of the best scoring closed path candidate contained in received incoming statelets at an originating node.
Figure 13B:
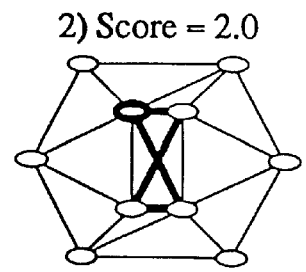
Figure 13C:
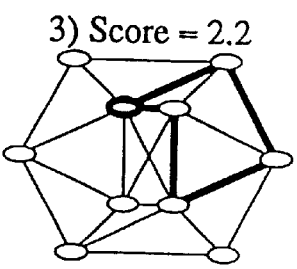
Figure 13D:
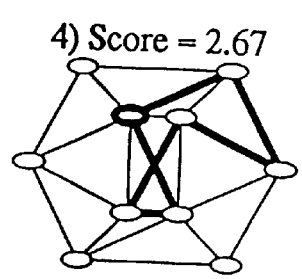
Figure 13E:
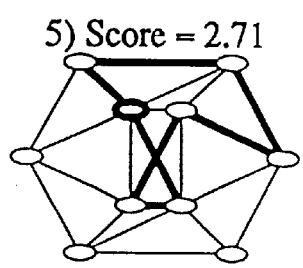
Figure 13F:
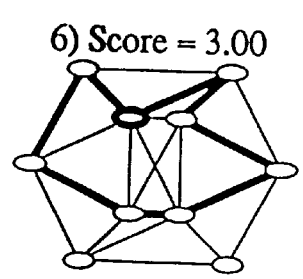
Figure 13G:
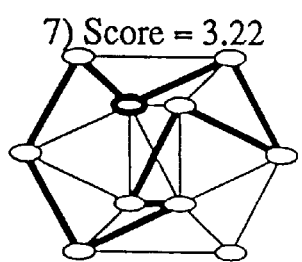
Figure 13H:
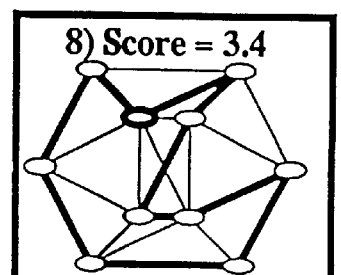
Figure 14A:
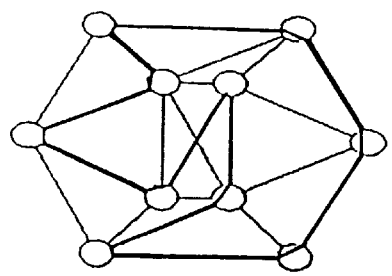
FIGS. 14A–14D show examples of the patterns which results in a sample network using the DCPC with originating rode in descending node total working links.
Figure 14B:
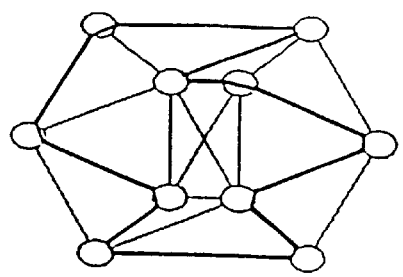
Figure 14C:
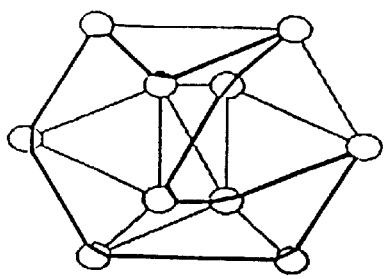
Figure 14D:
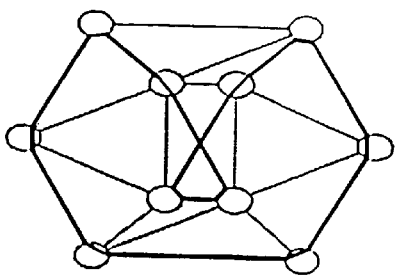
Figure 15A:
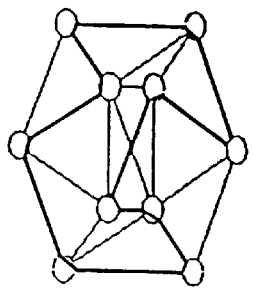
FIGS. 15A–15E show an example of patterns which result in a sample network using the DCPC with originating node in increasing node total working links.
Figure 15B:
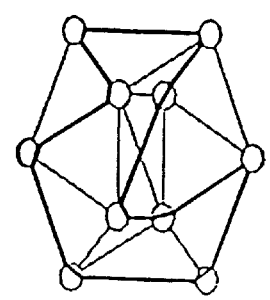
Figure 15C:
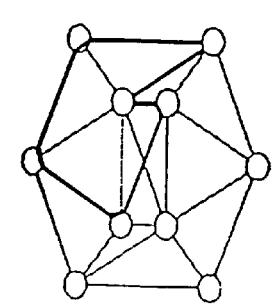
Figure 15D:
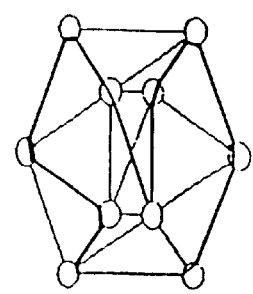
Figure 15E:
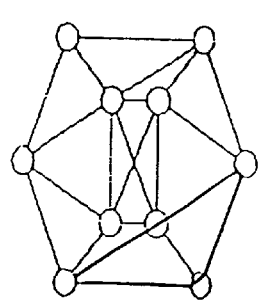
Figure 16A:
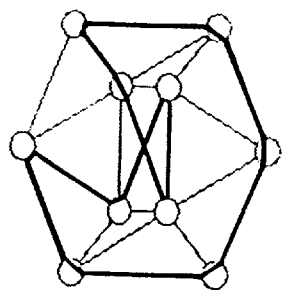
FIGS. 16A–16F show examples of patterns which result in a sample network using the DCPC with closed path order in descending node total working links with sparing patterns generated by IP2-closed path (defined below)
Figure 16B:
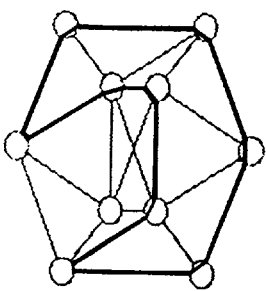
Figure 16C:
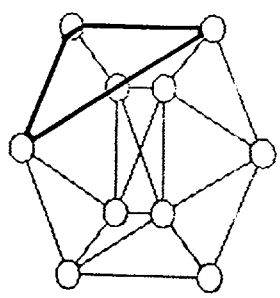
Figure 16D:
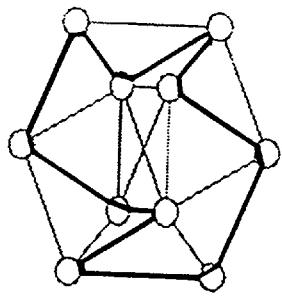
Figure 16E:
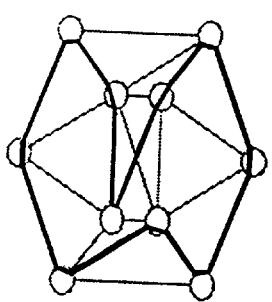
Figure 16F:
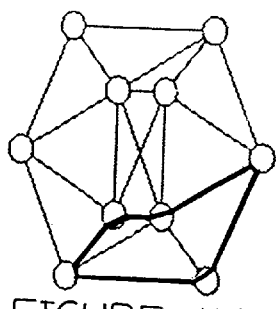
Figure 17A:
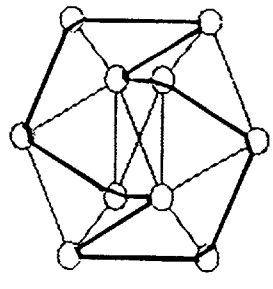
FIGS. 17A–17E are examples of patterns which result in a sample network using the DCPC with closed path order in increasing node total working links with the sparing plane. generated by IP2-closed path.
Figure 17B:
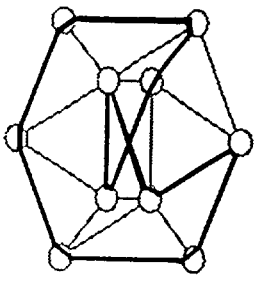
Figure 17C:
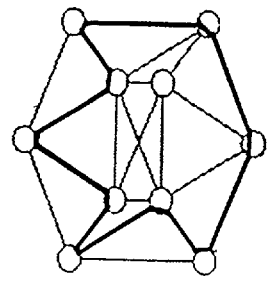
Figure 17D:
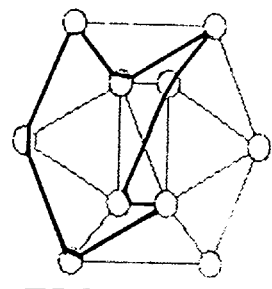
Figure 17E:
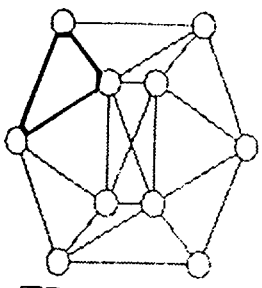

As an example of the iterative nature of the simulation, FIG. 12 contains a plot of the score of the best received incoming statelet, by the current originating node, versus the simulation iteration. In the plot, four distinct structures appear; each structure corresponds to the search and construction of a single PC closed path. At the left most edge of each structure, the plot can be seen to start at zero and then step up. Each step corresponds to the arrival of an incoming statelet with a superior score and an improvement to the best candidate closed path received by the originating node. The structure then plateaus which corresponds to the originating node's timer counting down (the timer was set to countdown 50 iteration.) When the timer counts out, the originating node initiates the construction of the closed path and resets the best received score to zero (this corresponds to the right edge of each structure.) Although, the graph goes up to only 300 iterations, the actual simulation continued for 500 more iterations. However, no more PC closed paths were possible within the network after the construction of the fourth closed path and, so, the plot remains at zero after this point. FIGS. 13A–13H show examples of the successive displacement of the best received closed path candidate as a originating node samples the incoming statelets generated by the evolving statelet broadcast. The statelet broadcast, from which the incoming signatures containing these closed paths originate, is the broadcast represented by the left most structure in FIG. 12. The arrival of each superior incoming signature, can be seen as a step in the left most edge of this structure. During the evolution of the statelet broadcast, 8 superior incoming statelets arrive at the originating node (superior in the sense that their score is better than that of any previously received statelet.) Each closed path in FIGS. 13A–13H corresponds to the closed path contained within a superior incoming statelet and the score above the closed path corresponds to the statelet's score. The originating node shown in each of FIGS. 13A and 13H is shown in bold, while the bold closed path in each figure is the best received closed path. The closed paths are ordered in the same order of arrival as the superior statelet to which each closed path corresponds. After the arrival of the 8the superior statelet, no more incoming statelets with better scores appear at the originating node. Eventually, the originating node's timer times out and the 8the closed path, as the best received closed path, is formed within the network's spare capacity.

FIGS. 14A–14D, and 15A–15D show how a PC pattern that is generated in Net1 by the DCPC, with originating node order sorted in order of decreasing total node working links and increasing total node working links, respectively. Table 4 contains the network restorability results, for the decreasing order case, over all possible span failures for restoration using only conventional KSP restoration, restoration using only pure PC paths, and two-step restoration. Table 6 contains the restorability results for the increasing order case. Table 5 contains the total crossconnection events, for the decreasing order case, over all possible failed spans, for KSP restoration alone and for 2-step restoration. The crossconnection results for the increasing order case is presented in Table 7.

FIGS. 16A–16F and 17A–17E contain examples of the PC patterns generated in Net1 by the DCPC, for decreasing and increasing closed path order, when run within the network sparing plans generated by the 100% PC closed path restorable IP method (IP2-Closed path.) Tables 8 and 10 contain the restorability results for the two orders when using IP2-closed path with the test networks. Tables 9 and 11 contain the corresponding crossconnection results.

For the original network sparing plans, the performance of the distributed closed path generator at times approached that of the IP based PC closed path design (it equals the performance for Net1 using the descending ordering) but, as the distributed algorithm is based on a heuristic, there was no guarantee of optimal closed path generation. Although, the overall performance did not exactly equal that of the IP PC designs, the results were still quite good. Using the descending order, the distributed closed path generator generated PC restorability scores which ranged between 82% and 95%. The overall restorability using PC with leftover KSP restoration varied between 94% and close to 100%. Also, the crossconnect results showed the result of using a simple pattern as the PC plan's building block; the total number of crossconnection opens was quite low for all test networks. In addition, the total number of crossconnection closures was significantly lower for restoration using PC paths compared to KSP restoration alone, in all the test networks.

The performance of the DCPC, when run using the sparing generated for the test networks using IP2-Closed path, was in general better than when run using the original sparing, with improvements in PC restorability, two-step restorability and total crossconnection event numbers. However, it did not achieve, although it did approach, the performance of the original PC closed path plan which was generated by the IP.

As expected the performance of the descending order execution was, in general, better than that of the increasing order execution producing better PC restorability scores and PC plus leftover KSP restorability scores for 4 out of the 5 test networks when run in the test network's original sparing plans (decreasing order was better than increasing order in 3 of the 5 best networks when using the sparing plans generated using IP2-closed path.) The algorithms dependency on the order in which the network nodes assume the role of the originating nodes is shown by the variation in the two orders scores.

Apparatus for Implementation of the Invention

Figure 18:
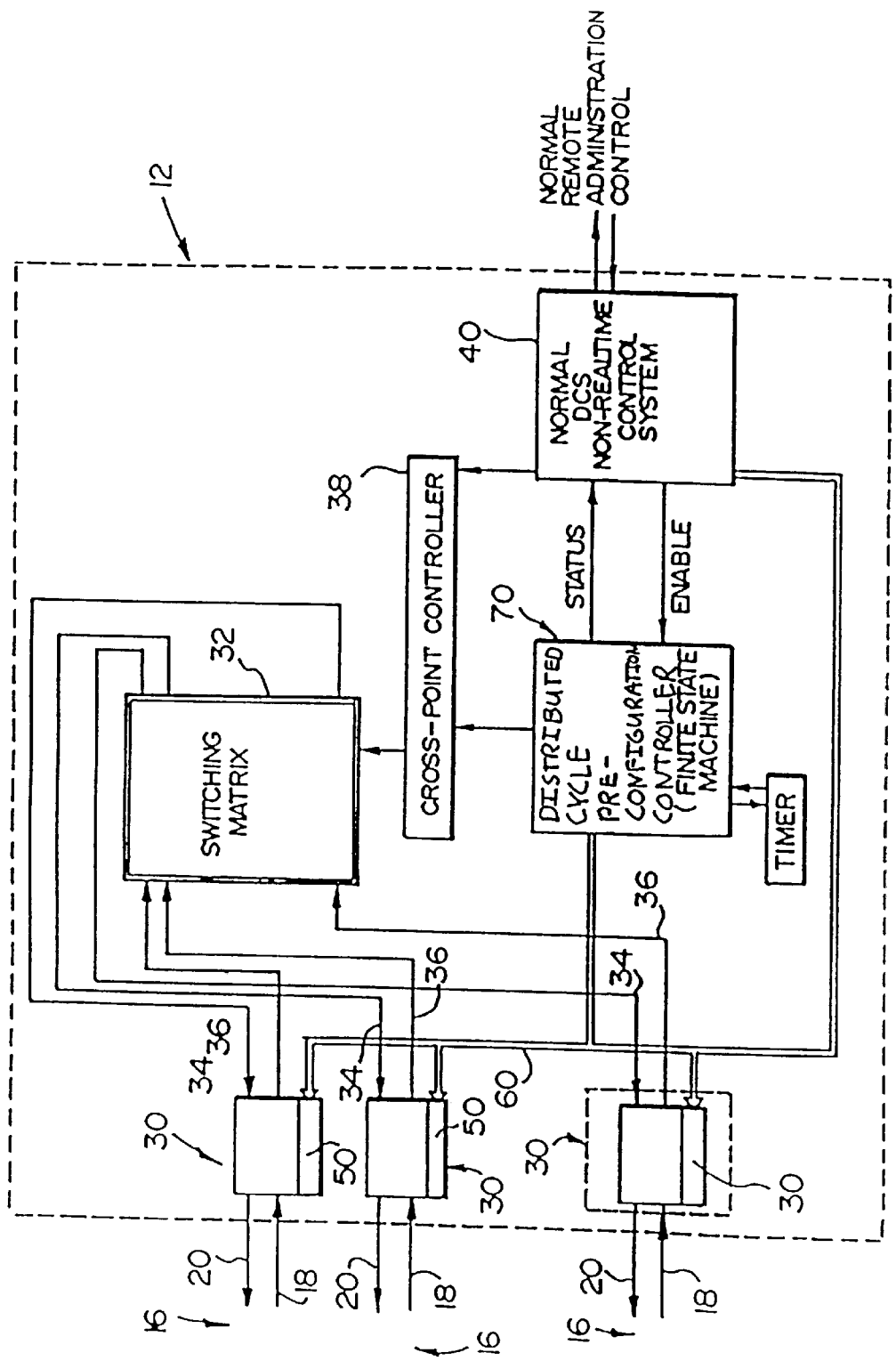
FIG. 18 is a schematic illustrating a digital cross-connect machine equipped with the necessary elements so that when each node of the networks for example of FIGS. 1A–2D is so equipped, the objective of pre-configuration is achieved.

The construction and operation of apparatus for implementation of the invention is shown in FIGS. 18–21. FIG. 18 expands the view of the DCS machines with modifications required by this invention, placed at every node of the networks in FIGS. 1A, 1B and 2 or any other node described in this patent document. With reference to FIG. 18, it can be seen that the creation of a pre-configured closed loop network requires two additional elements in the crossconnection machines of the network. In FIG. 18, components 30, 32, 34, 36, 38, 40, 42 and 44 comprise the normal general embodiment of a crossconnect machine, for the purposes that are essential here. The dashed outer boundary in FIG. 18 represents nodes. The known crossconnect machine structure is comprised of bi-directional transmission interfaces 30, which are connected to external transmission lines 16, which may be coaxial cable, fiber, or radio, for example, and connected internally to the switching matrix 32 of the DCS via paths 34, 36. The switching matrix is operated by a crosspoint operator means 38 which usually comprises hardware and software. As known in the art, the crossconnect switching matrix and all interface cards are directly monitored and controlled exclusively by the DCS operating system 40 and matrix reconfigurations are only performed through external command and telemetry links by a remote administrative centre often called NOC (Network Operations Center).

For the implementation of the invention, means 50 are added to detect statelets, added transparently to the carrier signals of the network and provide a method for directly reconfiguring the switching matrix, without remote control, in accordance with the logical method implemented by the Finite State Machine (FSM) 70.

Each node in the network has a crossconnect machine incorporating, for the purposes of the invention, statelet receiving and transmitting circuit means 50 on each transmission interface card 30 and an independent FSM 70 for processing receive statelets, controlling transmit statelets and recognizing statelet determined conditions under which the FSM requests operation of a specific crosspoint in switching matrix 32 through shared access to the Crosspoint Controller 38.

Figure 19:
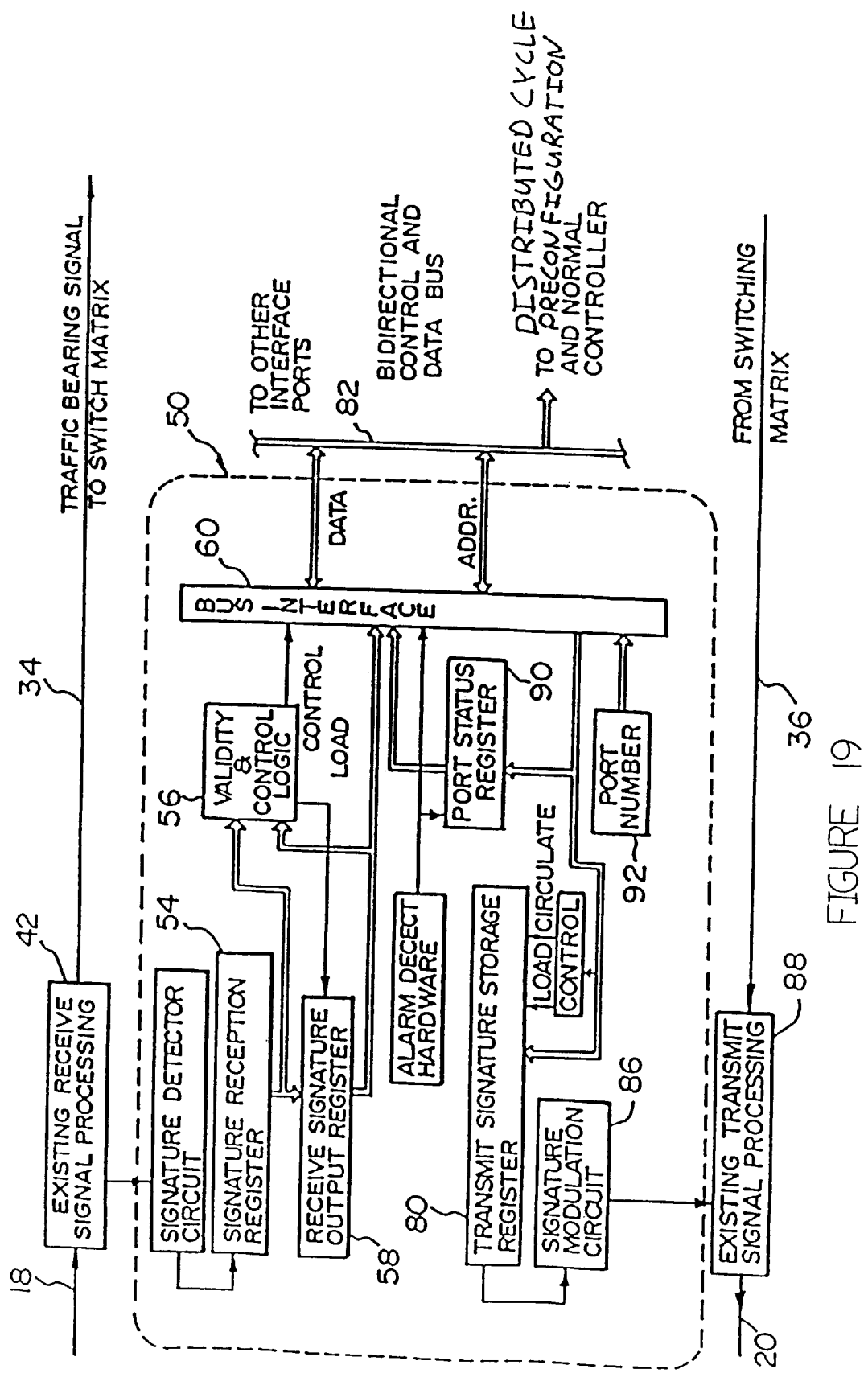
FIG. 19 is a schematic illustrating signature reception and transmission circuits added by a preferred embodiment of the present invention to each transmission line interface block illustrated in FIG. 3.

FIG. 19 is an expanded view of the statelet transmit and receive circuitry shown as 50 in FIG. 18, FIG. 19 is presented for consideration in conjunction with FIGS. 20A–20C which detail the logical content of the statelet receiving and transmitting registers and associated status ports shown only as registers in FIG. 19.

With reference to FIG. 19, the existing receive propagation path 12 and the existing receive signal processing interface card 30 are shown as they were in FIG. 18 and item 50 of FIG. 18 is exploded for closer view. The existing receive signal processing circuitry 42 is connected to the new circuits only in that a copy of the composite signal or a copy containing only the logical binary content of the received traffic signal plus overhead is provided as required to the statelet detector circuit 52. Statelet detector circuit 52 processes the received signal in a manner such that the particular bits or other attribute(s) of the signal used for transparent conveyance of the statelet information is recovered so as to identify the individual signaling elements of the statelet on that signal, if any. Various techniques for doing this are known, several of which are disclosed in U.S. Pat, No. 4,956,835. It is within the scope of this invention that any number of schemes for modulation and detection of transparent statelet transport methods are possible for implementation of the invention in transport networks using different, transport signal formats such as DS-1, DS-3, Syntran, Sonet, or CEPT formats.

Having detected the individual signaling elements of the statelet, statelet detector circuit 52 feeds its output into a statelet reception register 54. Each time a complete and valid statelet is recognized by a validity and logic control circuit 56 to be present in the statelet reception register 54 and that statelet is also seen by the logic control circuit 56 to be different in from the current contents of a statelet storage register 58, then the controller 56 causes the transfer of the newly received statelet in statelet reception register 54 to receive statelet output register 58, where it will stay until another valid but different statelet appears on the link 18.

Once the new statelet is in the receive statelet output register, bus interface 60 connected to FSM 70 (FIG. 18) raises an internal flag indicating that a new statelet has been received and, when appropriate, communicates the statelet to the controller over the bus and clears the 'new statelet' flag once the controller has read the statelet. Thereafter, the statelet remains addressable for reference by the controller as may be needed in executing its control logic sequences.

Many means for accomplishing the equivalent peripheral-to-controller transfer function are known including direct connections between each DCS port statelet circuit and the controller or there may be a shared interrupt line followed by polling or a vectored interrupt arrangement, etc. In all of these schemes, however, it is an aspect of this invention that the controller needs no memory of its own since all statelets and status data which it needs to implement its function are retained as a distributed memory on each interface port card of the DCS machine. The controller polls continually for new statelets or each new statelet is explicitly brought to the controllers attention by an interrupt because the controller implementing the pre-configuration process is implemented as an event driven finite state machine and events are determined in terms of statelet appearances, changes and disappearances.

In a preferred embodiment, when bus interface 60 is alerted that a new statelet has been received, the bus interface logic completely handles the subsequent transfer of the new statelet contents and the identification of the respective DCS interface port along with the status bits to the FSM 70 in FIG. 18 by known bus interfacing and transaction techniques.

With reference to FIG. 18, the contents of any valid statelet received off a transmission interface are shown and will be discussed in detail. Suffice it to say now that checkbit fields for any number of known error checking and/or error detecting schemes can be appended to the statelet data field shown in FIGS. 20A–20C, and such circuitry would also be provided in statelet reception register 54 or control logic 56 of FIG. 19 without changing the nature of this invention.

The statelet receive and transmit circuit 50 includes a transmit statelet storage register 88 which can be loaded by FSM 70 over bus 82 and bus interface 60. This provides a means by which the FSM 70 can apply a desired transmit statelet to any desired transmission path 28 as may be appropriate to implement the logic of the method of the present invention embodied in FSM 70 in FIG. 18. Through control logic 84, the bus interface can load a new statelet into Register 80 and then, once loaded, cause the repeated circulation of the contents of the register so that, by means of a transmit statelet modulation circuit 86, the transmit statelet in register 80 is indefinitely repeated on the outgoing transmission link 28.

Also shown in FIG. 19 is a Port Status Register 90 which stores certain information used by FSM 70 in the preferred embodiment. The contents of the port status register cart be read by FSM 70 and, in the case of an alarm, the alarm-detection hardware is arranged to activate bus interface 60 to forward the contents portnumber register 92 and port status register 90 to FSM 70 without delay. Port status register 90 contains elements 100, 102, 104 and 106 shown in FIG. 20. ALARM 100 (FIG. 20B) is a single bit that is set if the corresponding DCS transmission interface experiences a receive loss of signal, a bit error rate degradation, or a loss of timing, etc. or, if external transmission terminal equipment in the same building has detected an alarm on the corresponding channel and this information is connected over to the respective DCS interface port. Those skilled in the art of transmission equipment and interface design will appreciate that there are many techniques and criteria for the rapid determination of loss of transmission integrity. The alarm bit is set by hardware and may be reset by the DCS controller after acknowledgement.

Also present in the Port Status Register is a SPARE bit 102 (FIG. 20B). This status bit is written and maintained by DCS operating System 40 under conditions of normal operation. It indicates whether the given port interface is at any given time in traffic-bearing use or is in an equipped-but-idle configuration. If SPARE is true and ALARM is false, then the given transmission interface port is available for use in the method of the invention. If SPARE is false (the interface is carrying traffic) and ALARM becomes true, then the method of the invention will work to restore the lost traffic by network rerouting on this and all similar working links affected by the failure event.

The CONNECTED bit 104 is not essential but is a single bit which logs whether this interface port, whether SPARE or not, is actually connected through the matrix to any other interface port forming a path through the DCS machine. If CONNECTED is true, then the field denoted ASSOC-PORT-ID 106 contains the number of the port to which this port is presently connected through the matrix.

If CONNECTED is false, then ASSOC-PORT-ID may either contain a nul indicator or it may store information used by the FSM 70 to assist in the faster manipulation of statelets according to the statelet processing method described. Specifically, when a DCS rebroadcasts a statelet arriving on a certain port to a number of other ports as in the forward flooding wave, the ASSOC-PORT register of each port that is transmitting a rebroadcast statelet stores the port number where the precursor statelet for these repeated statelets is found. Depending on circumstances, ASSOC-PORT registers and CONNECTED status bits can be written either by the normal DCS or Pre-configuration DCS controllers.

Figure 21:
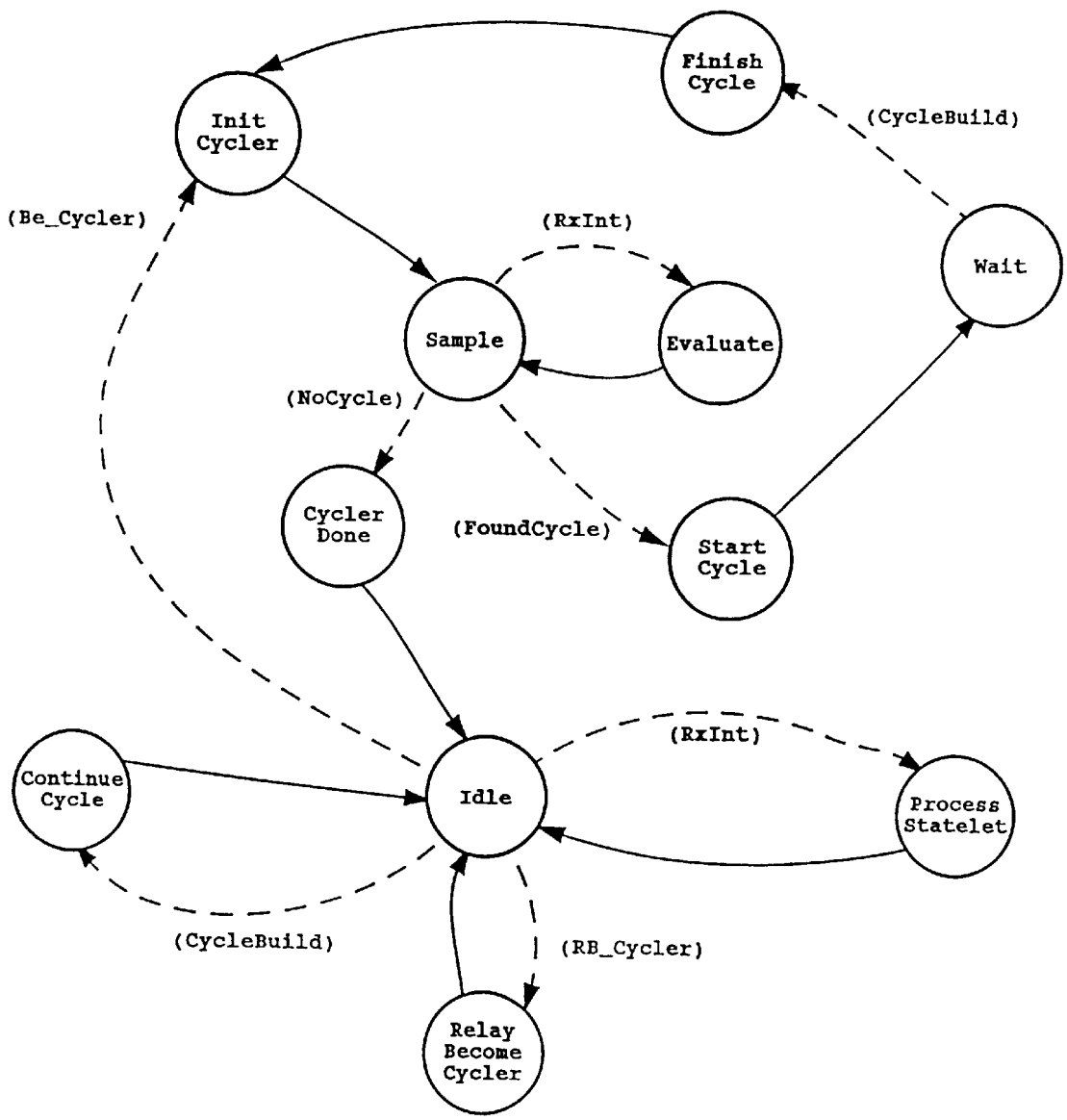
FIG. 21 illustrates the highest level logical structure of a Finite State Machine used at a node for the implementation of the invention.

The operation of the FSM 70 is now described in relation to FIG. 21. There are two kinds of transitions within the FSM 70: conditional transitions are represented as dashed arrows within the FSM, while forced transitions are represented by solid arrows. Conditional transitions only occur when a condition associated with the transition is met, while forced transitions always take place. The following is a list of the FSM's conditional transitions:

Be_Cycler A command is received by a node to assume the role of the cycler node. This command can take the form of a statelet transmission, or in the case of the very first cycler to assume the cycler role, a central mechanism or a self-scheduled alarm by the node.

CycleBuild A relayed command from the cycler node to continue the building of a cycle.

RB_Cycler Relay the statelet flood which commands a node to assume the role of the cycler.

RxInt An interrupt has been raised at a port card due to the arrival of a statelet.

NoCycle The cycler node's countdown timer has triggered and no suitable cycle was found.

FoundCycle The cycler node's countdown timer has triggered and a suitable cycle was found.

CycleBuild The construction of a cycle has looped by around to the cycler node which initiated it.

In any of the idle, sample or weight states, the FSM 70 pauses until a state transition occurs.

In the evaluate state, the FSM 70 evaluates an incoming or received statelet to see if it contains a superior rute. Firstly, the FSM 70 makes sure the incoming statelet is of the proper type, and then compares the score of that incoming statelet to the best previously found score for statelets of that type.

In the InitCycler state, the local node at which the FSM 70 is located assumes the role of the originating node. The FSM 70 initializes a statelet broadcast with a single outgoing statelet on each span which has on it at least one available spare link. Each outgoing broadcast has a unique index associated with it. The FSM 70 resets the current value of a register containing the identity of the best closed path and best closed path store in anticipation of starting sampling. The FSM 70 sets a countdown timer alarm to the predetermined sampling interval.

In the StartCycle state, the FSM 70 has finished sampling the routes followed by incoming statelets, and begins to build a new closed path of cross-connections and spare lengths. Firstly, the FSM 70 cancels all outgoing broadcasts, and begins construction of the closed path. The FSM 70 finds the node or span which was last traversed by the best score incoming statelet. The FSM 70 then sends a closed path construction request statelet backwards along the route followed by the statelet with the best score.

In the FinishCycle state, the FSM 70 confirms that a closed path build request has looped around, and marks the port, on which the construction statelet arrived, as used. The FSM 70 then closes a crosspoint to complete the closed path, and updates the local lists of unprotected working links and available spares.

In the state ProcessStatelet, the node processes a new statelet. The FSM 70 checks to see whether an interrupt represents a new statelet or a statelet disappearing, resets the local scores for the port, and cancels any broadcast. The FSM 70 checks for outgoing statelets which were being re-broadcast from a statelet which previously existed on the port, but was overwritten by the new statelet. If such outgoing statelets exist, they are cancelled. If a statelet incoming to the node is eligible, it is re-broadcast. The FSM 70 forms a list of all incoming statelets at the local node. It re-broadcasts each statelet, to the largest extent possible, within the existing outgoing statelet broadcast pattern.

In the state RelayBecomeCycler, the FSM 70 cancels broadcasts, finds which node initiated a broadcast instructing nodes to become an originating node, and finds which node is next to become an originating node. The node floods or relays a copy of the command instructing the nodes to become originating nodes to all adjacent nodes except the node from which the instructing statelet came.

In the ContinueCycle state, the FSM 70 first marks the span on which an incoming statelet arrived as used, cancels all broadcasts, and continues building the closed path by sending an instruction to the next node along the route to continue construction of the closed path. The FSM 70 adjusts available spares and uncovered working spans. Finally, the FSM 70 makes a cross point to form the local nodes part of the closed path.

In the CyclerDone state, the FSM 70 records that the local node has been an originating node. If the local node is not the last originating node, it initiates a flood command which instructs the next node in a pre-determined list of originating nodes to become the next originating node, and also marks any statelet broadcast with the ID of the local node as the send node in that statelet. If the local node is the last originating node, execution of the protocol ceases.

The method of broadcasting a statelet with the statelet carrying its own route information in a data field may also be used to find and create routes of connected spare links. As in the SHN technique, when the object is only to find a route, and not a closed route, the statelet may be given a target node identification and it will be broadcast until it reaches the target node. The route information in the statelet may be used to find the route taken by the statelet. In this method, statelets may be ordered for preferential broadcast by rules that do not relate to the numPaths field, but which may, for example, simply depend on the hop count (the statelet with the smallest hop count being broadcast for example). Further, in the general application of the method of the invention, the ordering for preferential broadcast is not restricted to an evaluation of the numPaths and hopcount fields, but may also use other measures.

When a span failure occurs, as for example shown in FIGS. 1A or FIG. 1B, traffic may be re-routed by directing the traffic along the closed path by operating the cross-connections at the end nodes, using the cross-point controller 38 under control of the control system 40.

A pseudo-code representation of the operation of the FSM 70 follows as an appendix.

A person skilled in the art could make immaterial modifications to the invention described in this patent without departing from the essence of the invention.

TABLE 1

Restorability using KSP and IP-1 PC Cycle Design

| Network | KSP Restorability (%) | Cycle-PC Restorability (%) | 2-Step Restorability (%) |
|---|---|---|---|
| Net1 | 100 | 93.66 | 93.66 |
| Net2 | 100 | 96.58 | 100 |
| Net3 | 100 | 96.86 | 99.95 |
| Net4 | 100 | 75.88 | 98.91 |
| Net5 | 100 | 94.93 | 99.95 |

TABLE 2

Total Crossconnect Events for IP-PC Cycle-Oriented Designs.

| Network | Xpts Closed KSP | Xpts Closed Cycle-PC | Xpts Opened Cycle-PC | Total Xpt Events 2-step |
|---|---|---|---|---|
| IP-1: Net1 | 310 | 0 | 174 | 174 |
| IP-1: Net2 | 3984 | 92 | 2260 | 2352 |
| IP-1: Net3 | 13787 | 366 | 7086 | 7452 |
| IP-1: Net4 | 84389 | 20032 | 55419 | 75451 |
| IP-1: Net5 | 8529 | 312 | 4067 | 4379 |
| IP-2: Net1 | 291 | 0 | 190 | 190 |
| IP-2: Net2 | 4176 | 0 | 2108 | 2108 |
| IP-2: Net3 | 20744 | 0 | 6860 | 6860 |
| IP-2: Net4 | 86048 | 0 | 45216 | 45216 |
| IP-2: Net5 | 13727 | 0 | 3850 | 3850 |

TABLE 3

Spare Capacity Comparison of Cycle-Oriented PC and KSP Designs

| Network | % Excess between Original and PC Cycle |
|---|---|
| Net1 | 9.09 |
| Net2 | 3.07 |
| Net3 | 0 |
| Net4 | 18.54* |
| Net5 | 0* |

Best feasible solution prior to premature CPLEX termination due to memory limitation.

TABLE 4

Network Restorability using Standard KSP and PC Restoration using the DPCD with Cycler Order in Descending Total Node Working Links Order

| Network | KSP Restorability (%) | PC Restorability (%) | 2-step Restorability (%) |
|---|---|---|---|
| Net1 | 100 | 93.66 | 93.66. |
| Net2 | 96.87 | 95.01 | 99.43 |
| Net3 | 100 | 81.73 | 94.53 |
| Net4 | 100 | 85.12 | 94.93 |

TABLE 4-continued

Network Restorability using Standard KSP and PC Restoration using the DPCD with Cycler Order in Descending Total Node Working Links Order

| Network | KSP Restorability (%) | PC Restorability (%) | 2-step Restorability (%) |
|---|---|---|---|
| Net5 | 100 | 92.20 | 99.50 |

TABLE 5

Total Network Crossconnect Events Results using Standard KSP and PC Restoration using the DPCD witk Cycler Order in Descending Total Node Working Links Order

| Network | Xpts Closed KSP | Xpts Closed PC | Xpts Opened PC | Total Xpt Events PC |
|---|---|---|---|---|
| Net1 | 310 | 0 | 174 | 174 |
| Net2 | 3984 | 122 | 2220 | 2342 |
| Net3 | 13787 | 1917 | 7011 | 8928 |
| Net4 | 84389 | 8269 | 43277 | 51546 |
| Net5 | 8529 | 455 | 3985 | 4440 |

TABLE 6

Network Restorability using Standard KSP and PC Restoration using the DPCD with Cycler Order In Increasing Total Node Working Links Order

| Network | KSP Restorability (%) | PC Restorability (%) | 2-step Restorability (%) |
|---|---|---|---|
| Net1 | 100 | 84.51 | 84.51 |
| Net2 | 96.87 | 85.33 | 96.87 |
| Net3 | 100 | 82.86 | 96.29 |
| Net4 | 100 | 84.91 | 94.57 |
| Net5 | 100 | 86.13 | 98.86 |

TABLE 7

Total Network Crossconnect Events Results using Standard KSP and PC Restoration using the DPCD with Cycler Order In Increasing Total Node Working Links Order

| Network | Xpts Closed KSP | Xpts Closed PC | Xpts Opened PC | Total Xpt Events PC |
|---|---|---|---|---|
| Net1 | 310 | 0 | 162 | 162 |
| Net2 | 3984 | 420 | 2278 | 2698 |
| Net3 | 13787 | 1666 | 6595 | 8261 |
| Net4 | 84389 | 7812 | 44074 | 51886 |
| Net5 | 8529 | 1074 | 4190 | 5264 |

TABLE 8

Network Restorability using Standard KSP and PC Restoration using the DPCD with Cycler Order in Descending Total Node Working Links Order with the Sparing Plans generated by IP2-Cycle

| Network | KSP Restorability (%) | PC Restorability (%) | 2-step Restorability (%) |
|---|---|---|---|
| Net1 | 100 | 94.37 | 97.18 |
| Net2 | 100 | 99.15 | 100 |
| Net3 | 100 | 90.02 | 97.12 |
| Net4 | 100 | 96.84 | 99.00 |
| Net5 | 100 | 92.42 | 96.44 |

TABLE 9

Total Network Crossconnect Events Results using Standard KSP and PC Restoration using the DPCD with Cycler Order in Descending Total Node Working Links Order with the Sparing Plans generated by IP2-Cycle

| Network | Xpts Closed KSP | Xpts Closed PC | Xpts Opened PC | Total Xpt Events PC |
|---|---|---|---|---|
| Net1 | 291 | 9 | 203 | 212 |
| Net2 | 4176 | 20 | 2080 | 2100 |
| Net3 | 20744 | 1074 | 6783 | 7857 |
| Net4 | 86048 | 1762 | 42292 | 44054 |
| Net5 | 13727 | 382 | 3828 | 4210 |

TABLE 10

Network Restorability using Standard KSP and PC Restoration using the DPCD with Cycler Order in Increasing Total Node Working Links Order with the Sparing Plans generated by IP2-Cycle

| Network | KSP Restorability (%) | PC Restorability (%) | 2-step Restorability (%) |
|---|---|---|---|
| Net1 | 100 | 83.10 | 95.07 |
| Net2 | 100 | 98.72 | 100 |
| Net3 | 100 | 94.44 | 97.94 |
| Net4 | 100 | 96.23 | 98.22 |
| Net5 | 100 | 86.86 | 97.49 |

TABLE 11

Total Network Crossconnect Events Results using Standard KSP and PC Restoration using the DPCD with Cycler Order in Increasing Total Node Working Links Order with the Sparing Plans generated by IP2-Cycle

| Network | Xpts Closed KSP | Xpts Closed PC | Xpts Opened PC | Total Xpt Events PC |
|---|---|---|---|---|
| Net1 | 291 | 44 | 199 | 243 |
| Net2 | 4176 | 32 | 2120 | 2152 |
| Net3 | 20744 | 558 | 6836 | 7394 |
| Net4 | 86048 | 2222 | 42020 | 44242 |
| Net5 | 13727 | 2044 | 4757 | 6801 |

Pseudo code representation of the DPCD Protocol

DCPC FSM State Transitions

There are two kinds of transitions within the FSM in Figure 1: conditional transitions are represented as dashed arrows within the FSM, while forced transitions are represented by solid arrows. Conditional transitions only occur when a condition associated with the transition is met, while forced transitions always take place. The following is a list of the FSM's conditional transitions:

```
Be_Cycler   -A command is received by a node to assume the role of the cycler node. This command can
             take the form of a statelet transmission, or in the case of the very first cycler to
             assume the cycler role, a central mechanism or a self-scheduled alarm by the node.
CycleBuild  -A relayed command from the cycler node to continue the building of a cycle.
RB_Cycler   -Relay the statelet flood which commands a node to assume the role of the cycler.
RxInt       -An interrupt has been raised at a port card due to the arrival of a statelet.
NoCycle     -The cycler node's countdown timer has triggered and no suitable cycle was found.
FoundCycle  -The cycler node's countdown timer has triggered and a suitable cycle was found.
CycleBuild  -The construction of a cycle has looped by around to the cycler node which initiated it.
```

DCPC FSM State and Function Logic

```
state Idle() {
   Pause until a State Transition occurs ;
} state Sample() {
   Pause until a State Transition occurs ;
} state Wait() {
   Pause until a State Transition occurs ;
} state Evaluate(PORT port) {
   /* Evaluate new statelet to see if it contains a superior cycle */

/* Make sure it is of the proper type */
   if ( port.rxReg.sendNode==nodeID) ) {
      paths = port.rxReg.numPaths;
      hops = port.rxReg.hopcount;
      score = paths / hops;

/* Compare to best previously found cycle */
      if (score > bestCycleScore) {
         bestCycleScore = score;
         bestCycleHops = hops;
         bestCycle = copy(port.rxReg.croute);
      }
   }
} state InitCycler() {
   /* The local node is to assume the role of the cycler */

Initialize a statelet broadcast with a single outgoing statelet on each span which has an
      at least one available spare link. Each outgoing broadcast has a unique index associated with
      it ;

Reset the current value of the bestCycle and bestCycleScore in anticipation of starting
      sampling. Set a countdown timer alarm to the predetermined cycler sampling interval;
```

23/6/97 64 Pseudo code representation of the DPCD Protocol

```
state StartCycle() [
    /* Finished sampling cycles, now its time to start building one */
    /* First cancel all outgoing broadcasts */
    cancelBroadcasts();

/* Now start the construction of the cycle */

/* Find the node/span which was previous to the cycler back along the cycle */
    node = One node back from cycler node along bestCycle;
    span = Adjacent span which connects nodeID to node;

/* Send a Cycle construction request statelet backwards along the cycle */
    cycleStartLink = link = findFreeLink(span);
    cycleStartSpan = span;

/* Setup port's transmission register */
    port = Port on span,link ;
    port.portStat=USED_SPARE; /* Set port status to show its link is being used in a cycle */
    port.txReg.hopcount = bestCycleHops;
    port.txReg.sendNode = nodeID;
    port.txReg.croute = copy of bestCycle ;
    Interupt port ;
]

state FinishCycle() [
    port = Port on interupt_span,interupt_link ;

/* Confirm that the cycle build request has looped around */
    if ( port.sendNode == nodeID && port.portStat == AVAILABLE_SPARE ) [
        /* Mark the port as used */
        port.portStat=USED_SPARE;

/* Close an xpt to close the cycle */
        Message Crossconnect controller to close a crosspoint between interupt_span,interupt_link
            and cycleStartSpan,cycleStartLink ;

/* Update the local lists of unprotected working links and available spares */
        availableSpare[cycleStartSpan]--;
        availableSpare[interupt_span]--;

updateUnprotectedWorkers(bestCycle);
    ]
]

state ProcessStatelet() [
    /* Process the new statelet */
    port = Port on interupt_span,interupt_link ;

/* Check if interupt represents a new statelet or a statelet disappearing */
    if (port.rxReg.index==NILL) [  /*Disappeared */

/* Reset the local scores for the port */
        inPaths[port].paths = inPaths[port].cpaths = NILL;
        inPaths[port].score = inPaths[port].cscore = NILL;

cancelBroadcastFromPort (port);
    ] else [ /* New statelet */
        calcInpaths (port);

Check for outgoing statelets which were being rebroadcast from a statelet which
            previously existed on port but was overwritten by the new statelet. If such outgoing
```

```
      statelets exist cancel them ;

/* If the statelet is eligible, rebroadcast it */
   if (port.rxReg.hopcount < maxHops) {
      broadcastStatelet (port);
   }

Form a list of all incoming statelets on the local node.  Rebroadcast each statelet to the
      largest extent possible within the existing outgoing statelet broadcast pattern.
   }
} state RelayBecomeCycler() {
   port = Port on interupt_span,interupt_link ;

cancelBroadcasts ();

/* Find which node initiated the becomeCycler broadcast and
      which node is to next become the cycler node */
   nextCycler = nextCycler indicated by port;
   sendNode = sendNode indicated by port;

Flood/relay a copy of the becomeCycler command to all adjacent nodes
      except the node connected to port ;
} state ContinueCycle() {
   port = Port on interupt_span,interupt_link ;

/* First mark the span on which the cycle arrived as used */
   port.portStat=USED_SPARE;

cancelBroadcasts ();

node = Node which is previous to local node along port.rxReg.croute ;
   span = Adjacent span connecting local node to node ;
   link = findFreeLink(span);
   nextPort = Port on span,link ;

/* Continue building the cycle */
   nextPort.portStat=USED_SPARE;
   nextPort.txReg.index = port.rxReg.index;
   nextPort.txReg.hopcount = port.rxReg.hopcount;
   nextPort.txReg.sendNode = port.rxReg.sendNode;
   nextPort.txReg.croute = Copy of port.rxReg.croute;
   Interupt nextPort to transmit a continue Cycle construction statelet;

/* Adjust available spares and uncovered working */
   availableSpare[span]--;
   availableSpare[interupt_span]--;
   updateUnprotectedWorkers (port.rxReg.croute );

/* Make an xpt to form the local node's part of the cycle */
   Message Crossconnect controller to close a crosspoint between interupt_span,interupt_link
      and span,link ;
}
```

23/6/97    66    Pseudo code representation of the DPCD Protocol

```
state CyclerDone() {
   cancelBroadcasts();

Record that the local node has been the cycler;

if (Local node is not the last cycler) {
      /* Initialize the next cycler commnd */
      Initiate a Flood command indicating the locally stored nextCycler node become the next cycler
         and, also, mark the flood with the local nodeID as the sendNode ;
   } else {
      /* The local node is the last cycler node and execution of the
         DCPC protocol may cease. */
      Stop running the DCPC protocol;
   }
} function findfreeLink (SPAN span) {
   /* Find the first available spare link on the span */

Find a spare link on span, which has not been previously used
      in forming a cycle, if possible ;
} function cancelBroadcasts () {
   /* Cancel all outgoing statelet transmissions */

Cancel all outgoing statelet broadcasts on all ports in the local node ;
} function updateUnprotectedWorkers (CYCLE cycle) {
   /* Update the local nodes list of unprotected working links (links which do not have paths
      available to them within the preformed cycles present in network spare capacity) to account
      for the placement of a single copy of cycle */

/* Trace through cycle, finding adjNodes */
   for (i = index from the start to the end of the route contained in cycle) {
      if (the node contained in cycle[i] is adjacent to the local node) {
         if ( the node cycle[i] appears directly before or after the local node in cycle ) {
            adjSpan = Adjacent span connecting the local node to the node in cycle[i] ;
            uncoveredWorking[adjSpan]--;  /* Can only get one path if adjacent along the cycle */
         } else {
            adjSpan = Adjacent span connecting the local node to the node in cycle[i] ;
            uncoveredWorking[adjSpan]-=2; /* Get two paths if not adjacent along the cycle */
         }

/* Check if the span has been overprovided with restoration paths */
         if (uncoveredWorking[adjSpan] < 0)
            uncoveredWorking[adjSpan] = 0;
      }
   }
} function calcInpaths (PORT port ) {
   /* Calculate the score and number of restoration paths for a new incoming statelet */

/* Get some info out of the port card receive registers */
   cinpaths = inpaths = port.rxReg.numPaths;
   cycle = port.rxReg.croute;
   hops = port.rxReg.hopcount;
   cycler = port.rxReg.sendNode;

/* Find out if you're next to the cycler */
   byCycler = TRUE if the local node is adjacent to the cycler in the network -- FALSE otherwise ;
```

Pseudo code representation of the DPCD Protocol

```
/* Go through and check the cycle for the PC paths it may provide */
/* For the case when the statelet is to be transmitted to a tandem node */
for (i= From the start to the end of cycle) {
    if (the node in cycle[i] is adjacent to the local node ) {
        if (the node cycle[i] is directly before the local node in the broadcast
                of the statelet in port) {
            npaths = 1; /* Can provide a single path */
        } else {
            npaths = 2; /* Can provide a pair of paths */
        }

/* Find an updated numPaths to account for the statelet's latest hop */
        /* Account for the overprovision of a span with restoration paths;
            only count paths useful to restoration */ if ( npaths < uncoveredWorking[j] ) {
            inpaths += npaths;
        } else {
            inpaths += uncoveredWorking[j];
        }
    }
}

/* Go through and check the cycle for the PC paths it may provide */
/* For transmission to the cycler node */
if (byCycler) {
    for (i= From the start to the end of cycle) {
        if (the node in cycle[i] is adjacent to the local node ) {
            if ( the node cycle[i] is directly before the local node in the broadcast of the
                    statelet in port OR the node cycle[i] is the cycler node ) {
                npaths = 1; /* Can provide a single path */
            } else {
                npaths = 2; /* Can provide a pair of paths */
            } if ( npaths < uncoveredWorking[j] ) {
                cinpaths += npaths;
            } else {
                cinpaths += uncoveredWorking[j];
            }
        }
    }
}

/* Store the results */
inPaths[port].paths = inpaths;
inPaths[port].cpaths = cinpaths;
inPaths[port].score = inpaths / hops;
inPaths[port].cscore = cinpaths / hops;
}
```

```
function broadcastStatelet (PORT port) {
   /* Broadcast a single incoming statelet to the largest degree possible within an existing
      broadcast pattern */ span = Span on which port exists ;
   link = Link on which link exists ;
   cycler = port.rxReg.sendNode;
   cycle = port.rxReg.croute;
   hops = port.rxReg.hopcount;
   index = port.rxReg.index;

/* Attempt to rebroadcast port's incoming statelet on each span falling on the local node */
   for (span_i= From start to end of set of spans which fall on the local node) {
      cycleNode = FALSE;
      broadcast = TRUE;

if ( (the adjacent node on the other side of span_i is not in cycle OR
            the adjacent node on the other side of span_i is the cycler) AND
           (span_i != span) ) {

/* Start competing with the pre-existing statelets for a place */
         worstScore = INFINITY;
         index_present = FALSE;
         betterPrec = FALSE;
         bestPrecLink = unoccupiedLink = worstLink = NILL;

for (link_j= From start to end of set of spare links on span_i) {
            port_out = Port on span_i,link_j ;
            if ( port_out.portStat==AVAILABLE_SPARE ) {
               if ( port_out.txReg.index == NILL ) { /* No statelet present */
                  if (unoccupiedLink==NILL)
                     unoccupiedLink=link_j;
               } else {
                  p_span = Span on which the incoming statelet from which
                           the statelet on port_out was rebroadcast ;
                  p_link = Link on which the incoming statelet from which
                           the statelet on port_out was rebroadcast ;
                  port_in = Port on p_span,p_link ;

if (index==port_in.txReg.index) { /* Statelet with matching index exists */
                     index_present = TRUE;

/* Check if the new statelet would is a better statelet than that on port_in */
                     if (the cycler node is the adjacent node across on span_i ) {
                        if (inPaths[port].cscore > inPaths[port_in].cscore) {
                           betterPrec = TRUE;
                           bestPrecLink = link_j;
                        }
                     } else {
                        if (inPaths[port].score > inPaths[port_in].score) {
                           betterPrec = TRUE;
                           bestPrecLink = link_j;
                        }
                     } if (betterPrec) {
                        Have found a link to broadcast on as there can only be a single statelet of a
                           given index on a span - Stop searching this span by Breaking out of loop.
                     }
                  } else {
                     /* Check if the new statelet has a better score than the existing statelet*/
                     if (cycler==adjNode[i]) {
                        if ( (inPaths[port_in].cscore < inPaths[port].cscore) &&
                             (inPaths[port_in].cscore < worstScore) ) {
```

```
            worstLink = link_j;
            worstScore = inPaths[port].cscore;
         }
      } else {
         if ( (inPaths[port_in].score < inPaths[port].score) &&
              (inPaths[port_in].score < worstScore) ) {
            worstLink = link_j;
            worstScore = inPaths[port_in].score;
         }
      }
    }
   }
  }
 }

/* Broadcast the statelet on a link on the span (if possible) */
 out_link = NILL;
 if (!index_present) {
    if (unoccupiedLink!=NILL) {
       out_link = unoccupiedLink; /* Broadcast on an unoccupied link */
    } else {
       if (worstLink!=NILL) {
          out_link = worstLink; /* Otherwise, broadcast on the worst link */
       }
    }
 } else {
    if (betterPrec)
       out_link = bestPrecLink;
 } if (out_link!=NILL) {
    /* Tx an outgoing statelet */
    port_tx = Port on span_i,out_link;
    port_tx.txReg.index = index;
    port_tx.txReg.hopcount = hops + 1;

if (the cycler on is on other end of span_i)
       port_tx.txReg.numPaths = inPaths[port].cpaths;
    else
       port_tx.txReg.numPaths = inPaths[port].paths;

port_tx.txReg.croute = Copy of cycle;
    Append local node ID To the end of port_tx.txReg.croute;

port_tx.txReg.sendNode = cycler ;

Interupt port_tx to indicate a new outgoing statelet is to be broadcast ;
   }
  }
 }
} function cancelBroadcastFromPort ( int span, int link ) {
   Cancel all outgoing broadcasts which originate from an incoming statelet on port ;
}
```

The embodiments of the invention in which an exclusive property or privilege is claimed are defined as follows:

1. A method of operating a telecommunications network in which the telecommunications network includes plural distinct nodes interconnected by plural distinct spans, each node having a digital cross-connect switch for making and breaking connections between links in adjacent spans forming span paths through the node, the method comprising the steps of:

a) providing a set of successive nodes capable of forming a closed path in the network, with at least one spare link between each pair of adjacent nodes in the closed path;

b) forming a cross-connection at each node in the closed path to connect spare links in each of the adjacent spans lying in the closed path and thus form a span path through each node in the closed path before occurrence of a span failure on a target span in the network lying on a path between two nodes, where the two nodes are in the closed path but the target span lies outside the closed path; and c) upon occurrence of a span failure on the target span, routing telecommunications traffic along the closed path.

2. The method of claim 1 in which providing a set of successive nodes capable of forming a closed path comprises:

(a1) selecting an originating node; and (a2) searching for and identifying a set of intermediate nodes that, together with the originating node, may form a closed path having at least one spare link between each pair of adjacent nodes in the closed path.

3. The method of claim 2 in which searching for a set of intermediate nodes that may form a closed path comprises:

broadcasting statelets from successive nodes in the network along successive spans having at least one spare link in each span at least until a first statelet is broadcast to the originating node, in which the successive nodes are not capable of forming a closed path that does not include the originating node and each statelet is prevented from being broadcast along the span on which the statelet arrived at the intermediate node.

* * * * *

UNITED STATES PATENT AND TRADEMARK OFFICE
CERTIFICATE OF CORRECTION

PATENT NO. : 6,421,349 B1
DATED : July 16, 2002
INVENTOR(S) : Demetrios Stamatelakis and Wayne D. Grover It is certified that error appears in the above-identified patent and that said Letters Patent is hereby corrected as shown below:

Title page,
Item [12], United States Patent, delete "Grover" and insert therefor -- Stamatelakis et al. --
Item [75], delete "Inventor: Wayne D. Grover; Edmonton (CA)" and insert therefor -- Inventors: Demetrios Stamatelakis; Wayne D. Grover, both of Edmonton (CA) --
Item [56], References Cited, U.S. PATENT DOCUMENTS, insert in appropriate order -- 4,956,835    09/1990    Grover    378/16 --
  OTHER PUBLICATIONS, --

> Potential for spare capacity preconnection to reduce crossconnection workloads in mesh-restorable networks, W.D. Grover, M.H. MacGregor, Electronics Letters, February 3, 1994, Vol. 30., No. 3, p. 194 - 195.
>
> An Optimal Spare-Capacity Assignment Model for Survivable Networks with Hop Limits, Meir Herzberg and Stephen J. Bye, Telecom Australia Research Laboratories, 6 pages, Proceedings of IEEE Globecom '94, Vol. 3, IEEE, 1994, pp. 1601-1606.
>
> Fiber Network Service Survivability, Tsong-Ho Wu, Artech House, Boston, © 1992, p. 1 - 211.
>
> Telecommunications Network Management into the 21st Century, Techniques, Standards, Technologies, and Applications, Chapter 11, Distributed Restoration of the Transport Network, p. 337 - 417, IEEE Press, 1993.
>
> A photocopy of Canadian patent application No. 2,161,847, filed October 31, 1995, (published May 1, 1997), including drawings and filing certificate, corresponding to U.S. patent application No. 08/551,709, filed November 1, 1995, 32 pages. --

> Information Sheet on Existing Telco Digital Cross-Connect Switch (DCS)
>
> PCT International Application No. PCT/US96/14999, filed September 18, 1996, entitled Communication System and Method Providing Optimal Restoration of Failed Paths, International Publication No. WO 97/11543, published March 27, 1997.
>
> PCT International Application No. PCT/US96/13830, filed August 28, 1996, entitled Deterministic Selection of an Optimal Restoration Route in a Telecommunications Network, International Publication No. WO 97/08860, published March 6, 1997.

UNITED STATES PATENT AND TRADEMARK OFFICE
CERTIFICATE OF CORRECTION

PATENT NO. : 6,421,349 B1
DATED : July 16, 2002
INVENTOR(S) : Demetrios Stamatelakis and Wayne D. Grover It is certified that error appears in the above-identified patent and that said Letters Patent is hereby corrected as shown below:

OTHER PUBLICATIONS, cont'd,

PCT International Application No. PCT/GB96/01914, filed August 6, 1996, entitled Route Finding in Communications Networks, International Publication No. WO 97/06645, published February 20, 1997.

PCT International Application No. PCT/GB96/01913, filed August 6, 1996, entitled Route Finding in Communications Networks, International Publication No. WO 97/06644, published February 20, 1997.

PCT International Application No. PCT/GB96/01912, filed August 6, 1996, entitled Route Finding in Communications Networks, International Publication No. WO 97/06643, published February 20, 1997.
- -

Signed and Sealed this

Ninth Day of March, 2004

JON W. DUDAS
*Acting Director of the United States Patent and Trademark Office*